(12) United States Patent
Ohta et al.

(10) Patent No.: US 11,553,373 B2
(45) Date of Patent: Jan. 10, 2023

(54) WIRELESS TERMINAL, WIRELESS BASE STATION, AND TRANSMISSION METHOD OF BUFFER STATUS REPORT

(71) Applicant: FUJITSU LIMITED, Kawasaki (JP)

(72) Inventors: Yoshiaki Ohta, Yokohama (JP);
Yoshihiro Kawasaki, Kawasaki (JP);
Takayoshi Ode, Yokohama (JP);
Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/061,489

(22) Filed: Oct. 1, 2020

(65) Prior Publication Data
US 2021/0029578 A1    Jan. 28, 2021

Related U.S. Application Data

(63) Continuation of application No. 16/216,456, filed on Dec. 11, 2018, now Pat. No. 10,834,628, which is a (Continued)

(51) Int. Cl.
*H04W 28/02* (2009.01)
*H04W 88/08* (2009.01)
(Continued)

(52) U.S. Cl.
CPC ... *H04W 28/0278* (2013.01); *H04W 72/1284* (2013.01); *H04W 88/02* (2013.01); *H04W 88/08* (2013.01); *H04W 72/14* (2013.01)

(58) Field of Classification Search
CPC ......... H04W 28/0278; H04W 72/1284; H04W 88/02; H04W 88/08; H04W 72/14
See application file for complete search history.

(56) References Cited

U.S. PATENT DOCUMENTS

| 2011/0171967 A1 | 7/2011 | Lee et al. |
| 2013/0089057 A1 | 4/2013 | Worrall et al. |
| 2013/0100908 A1 | 4/2013 | Xu et al. |

FOREIGN PATENT DOCUMENTS

| EP | 3 297 355 A1 | 3/2018 |
| JP | 2013-530648 A | 7/2013 |

(Continued)

OTHER PUBLICATIONS

3GPP TS 36.211 V14.3.0, "3rd Generation Partnership Project; Technical Specification Group Radio Access Network Evolved Universal Terrestrial Radio Access (E-UTRA); Physical channels and modulation (Release 14)", Jun. 2017.

(Continued)

*Primary Examiner* — Natasha W Cosme
(74) *Attorney, Agent, or Firm* — Myers Wolin, LLC

(57) ABSTRACT

A wireless terminal for a wireless communication, the wireless terminal includes: a memory that includes a buffer configured to store uplink data, wherein the uplink data is configured to be transmitted; and a controller configured to transmit a buffer status report, the buffer status report including a first index, wherein the first index is one of a plurality of buffer status indices and corresponds to a buffer size indicating a size of the uplink data stored in the buffer, wherein the memory is configured to store a buffer status table in which a range from a minimum value of the buffer to a maximum value of the buffer is divided into a plurality of subranges, the plurality of subranges being associated with a part of the plurality of buffer status indices, and a rest of the plurality of buffer status indices are associated with one or more reserved fields.

20 Claims, 16 Drawing Sheets

Related U.S. Application Data continuation of application No. PCT/JP2017/040996, filed on Nov. 14, 2017.

(51) Int. Cl.
*H04W 88/02* (2009.01)
*H04W 72/12* (2009.01)
*H04W 72/14* (2009.01)

(56) References Cited

FOREIGN PATENT DOCUMENTS

| | | |
|---|---|---|
| JP | 2013-531432 A | 8/2013 |
| JP | 2016-181925 A | 10/2016 |
| WO | 2016/182048 A1 | 11/2016 |

OTHER PUBLICATIONS

3GPP TS 36.212 V14.3.0, "3rd Generation Partnership Project; Technical Specification Group Radio Access Network Evolved Universal Terrestrial Radio Access (E-UTRA); Multiplexing and channel coding (Release 14)", Jun. 2017.
3GPP TS 36.213 V14.3.0, "3rd Generation Partnership Project; Technical Specification Group Radio Access Network Evolved Universal Terrestrial Radio Access (E-UTRA); Physical layer procedures (Release 14)", Jun. 2017.
3GPP TS 36.214 V14.2.0, "3rd Generation Partnership Project; Technical Specification Group Radio Access Network Evolved Universal Terrestrial Radio Access (E-UTRA); Physical layer; Measurements (Release 14)", Mar. 2017.
3GPP TS 36.300 V14.3.0, "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 14)", Jun. 2017.
3GPP TS 36.321 V14.3.0, "3rd Generation Partnership Project; Technical Specification Group Radio Access Network Evolved Universal Terrestrial Radio Access (E-UTRA); Medium Access Control (MAC) protocol specification (Release 14)", Jun. 2017.
3GPP TS 36.322 V14.0.0, "3rd Generation Partnership Project; Technical Specification Group Radio Access Network Evolved Universal Terrestrial Radio Access (E-UTRA); Radio Link Control (RLC) protocol specification (Release 14)", Mar. 2017.
3GPP TS 36.323 V14.3.0, "3rd Generation Partnership Project; Technical Specification Group Radio Access Network Evolved Universal Terrestrial Radio Access (E-UTRA); Packet Data Convergence Protocol (PDCP) specification Release 14)", Jun. 2017.
3GPP TS 36.331 V14.3.0, "3rd Generation Partnership Project; Technical Specification Group Radio Access Network Evolved Universal Terrestrial Radio Access (E-UTRA); Radio Resource Control (RRC); Protocol specification (Release 14)", Jun. 2017.
3GPP TS 36.413 V14.3.0, "3rd Generation Partnership Project; Technical Specification Group Radio Access Network Evolved Universal Terrestrial Radio Access Network (E-UTRAN); S1 Application Protocol (S1AP) (Release 14)", Jun. 2017.
3GPP TS 36.423 V14.3.0, "3rd Generation Partnership Project; Technical Specification Group Radio Access Network Evolved Universal Terrestrial Radio Access Network (E-Utran); X2 application protocol (X2AP) (Release 14)", Jun. 2017.
3GPP TS 37.324 V0.2.0, "3rd Generation Partnership Project; Technical Specification Group Radio Access Network E-UTRA and NR; Service Data Adaptation Protocol (SDAP) specification (Release 15)", Sep. 2017.
3GPP TS 37.340 V1.0.0, "3rd Generation Partnership Project; Technical Specification Group Radio Access Network Evolved Universal Terrestrial Radio Access (E-UTRA) and NR; Multi-connectivity; Stage 2 (Release 15)", Sep. 2017, with cover sheet.
3GPP TS 36.425 V14.0.0, "3rd Generation Partnership Project; Technical Specification Group Radio Access Network Evolved Universal Terrestrial Radio Access Network (E-UTRAN); X2 interface user plane protocol (Release 14)", Mar. 2017.
3GPP TS 38.201 V1.0.0, "3rd Generation Partnership Project; Technical Specification Group Radio Access Network NR; Physical layer; General description (Release 15)", Sep. 2017.
3GPP TS 38.202 V1.0.0, "3rd Generation Partnership Project; Technical Specification Group Radio Access Network NR; Services provided by the physical layer (Release 15)", Sep. 2017.
3GPP TS 38.211 V1.0.0, "3rd Generation Partnership Project; Technical Specification Group Radio Access Network NR; Physical channels and modulation (Release 15)", Sep. 2017.
3GPP TS 38.212 V1.0.0, "3rd Generation Partnership Project; Technical Specification Group Radio Access Network NR; Multiplexing and channel coding (Release 15)", Sep. 2017.
3GPP TS 38.213 V1.0.0, "3rd Generation Partnership Project; Technical Specification Group Radio Access Network NR; Physical layer procedures for control (Release 15)", Sep. 2017.
3GPP TS 38.214 V1.0.0, "3rd Generation Partnership Project; Technical Specification Group Radio Access Network NR; Physical layer procedures for data (Release 15)", Sep. 2017.
3GPP TS 38.215 V1.0.0, "3rd Generation Partnership Project; Technical Specification Group Radio Access Network NR; Physical layer measurements (Release 15)", Sep. 2017.
3GPP TS 38.300 V1.0.0, "3rd Generation Partnership Project; Technical Specification Group Radio Access Network; NR; NR and NG-RAN Overall Description; Stage 2 (Release 15)", Sep. 2017.
3GPP TS 38.321 V1.0.0, "3rd Generation Partnership Project; Technical Specification Group Radio Access Network NR; Medium Access Control (MAC) protocol specification (Release 15)", Sep. 2017, with cover sheet.
3GPP TS 38.322 V1.0.0, "3rd Generation Partnership Project; Technical Specification Group Radio Access Network NR; Radio Link Control (RLC) protocol specification (Release 15)", Sep. 2017, with cover sheet.
3GPP TS 38.323 V0.3.0, "3rd Generation Partnership Project; Technical Specification Group Radio Access Network NR; Packet Data Convergence Protocol (PDCP) specification (Release 15 )", Aug. 2017, clean version.
3GPP TS 38.323 V0.3.0, "3rd Generation Partnership Project; Technical Specification Group Radio Access Network NR; Packet Data Convergence Protocol (PDCP) specification (Release 15 )", Aug. 2017, marked up version.
3GPP TS 38.331 V0.0.5, "3rd Generation Partnership Project; Technical Specification Group Radio Access Network NR; Radio Resource Control (RRC); Protocol specification (Release 15 )", Aug. 2017, clean version.
3GPP TS 38.331 V0.0.5, "3rd Generation Partnership Project; Technical Specification Group Radio Access Network NR; Radio Resource Control (RRC); Protocol specification (Release 15 )", Aug. 2017, marked up version.
3GPP TS 38.401 V0.2.0, "3rd Generation Partnership Project; Technical Specification Group Radio Access Network NG-RAN; Architecture description (Release 15)", Jul. 2017, clean version, with cover sheet and list of open issues.
3GPP TS 38.401 V0.2.0, "3rd Generation Partnership Project; Technical Specification Group Radio Access Network NG-RAN; Architecture description (Release 15)", Jul. 2017, marked up version.
3GPP TS 38.410 V0.4.0, "3rd Generation Partnership Project; Technical Specification Group Radio Access Network NG-RAN; NG general aspect and principles (FFS) (Release 15)", Sep. 2017, clean version, with cover sheet and list of open issues.
3GPP TS 38.410 V0.4.0, "3rd Generation Partnership Project; Technical Specification Group Radio Access Network NG-RAN; NG general aspect and principles (FFS) (Release 15)", Sep. 2017, marked up version.
3GPP TS 38.413 V0.3.0, "3rd Generation Partnership Project; Technical Specification Group Radio Access Network NG Radio Access Network (Ng-Ran); Ng Application Protocol (NGAP) (Release 15)", Aug. 2017, clean version, with cover sheet and list of open issues.
3GPP TS 38.413 V0.3.0, "3rd Generation Partnership Project; Technical Specification Group Radio Access Network NG Radio

(56) References Cited

OTHER PUBLICATIONS

Access Network (NG-RAN); NG Application Protocol (NGAP) (Release 15)", Aug. 2017, marked up version.
3GPP TS 38.420 V0.2.0, "3rd Generation Partnership Project; Technical Specification Group Radio Access Network NG-RAN; Xn general aspects and principles (Release 15)", Jul. 2017, clean version, with cover sheet and list of open issues.
3GPP TS 38.420 V0.2.0, "3rd Generation Partnership Project; Technical Specification Group Radio Access Network NG-RAN; Xn general aspects and principles (Release 15)", Jul. 2017, marked up version.
3GPP TS 38.423 V0.2.0, "3rd Generation Partnership Project; Technical Specification Group Radio Access Network NG Radio Access Network (NG-RAN); Xn application protocol (XnAP) (Release 15)", Jun. 2017, clean version, with cover sheet.
3GPP Ts 38.423 V0.2.0, "3rd Generation Partnership Project; Technical Specification Group Radio Access Network NG Radio Access Network (NG-RAN); Xn application protocol (XnAP) (Release 15)", Jun. 2017, marked up version.
3GPP TS 38.470 V0.3.0, "3rd Generation Partnership Project; Technical Specification Group Radio Access Network NG-RAN; F1 general aspects and principles (Release 15)", Sep. 2017, clean version, with cover sheet.
3GPP TS 38.470 V0.3.0, "3rd Generation Partnership Project; Technical Specification Group Radio Access Network NG-RAN; F1 general aspects and principles (Release 15)", Sep. 2017, marked up version.
3GPP TS 38.473 V0.3.0, "3rd Generation Partnership Project; Technical Specification Group Radio Access Network NG-RAN; F1 application protocol (F1AP) (Release 15)", Sep. 2017, clean version, with cover sheet.
3GPP TS 38.473 V0.3.0, "3rd Generation Partnership Project; Technical Specification Group Radio Access Network NG-RAN; F1 application protocol (F1AP) (Release 15)", Sep. 2017, marked up version.
3GPP TR 38.801 V14.0.0, "3rd Generation Partnership Project; Technical Specification Group Radio Access Network Study on new radio access technology: Radio access architecture and interfaces (Release 14)", Mar. 2017.
3GPP TR 38.802 V14.1.0, "3rd Generation Partnership Project; Technical Specification Group Radio Access Network Study on New Radio Access Technology Physical Layer Aspects (Release 14)", Jun. 2017.
3GPP TR 38.803 V14.1.0, "3rd Generation Partnership Project; Technical Specification Group Radio Access Network Study on new radio access technology: Radio Frequency (RF) and co-existence aspects (Release 14)", Jun. 2017.
3GPP TR 38.804 V14.0.0, "3rd Generation Partnership Project; Technical Specification Group Radio Access Network Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network Study on channel model for frequency spectrum above 6 GHz (Release 14)", Jul. 2017.
3GPP TR 38.912 V14.0.0, "3rd Generation Partnership Project; Technical Specification Group Radio Access Network Study on New Radio (NR) access technology (Release 14)", Mar. 2017.
3GPP TR 38.913 V14.3.0, "3rd Generation Partnership Project; Technical Specification Group Radio Access Network Study on Scenarios and Requirements for Next Generation Access Technologies; (Release 14)", Jun. 2017.
International Search Report with Written Opinion of the International Searching Authority issued by the Japan Patent Office for corresponding International Patent Application No. PCT/JP2017/040996, dated Jan. 30, 2018, with an English translation.
Ericsson, "Aspects of BSR format and tables", Agenda Item: 10.3.1.6, 3GPP TSG-RAN WG2 Meeting #99bis, R2-1711181, Prague, Czech Republic, Oct. 9-13, 2017.
Huawei, "Buffer Size Table for CA", Agenda Item: 7 1.3.1, 3GPP TSG-RAN WG2 Meeting #70bis, R2-103755, Jun. 28, 2010-Jul. 2, 2010, Stockholm, Sweden.
ETSI, "LTE: Evolved Universal Terrestrial Radio Access (E-UTRA); Medium Access Control (MAC) protocol specification (3GPP TS 36.321 version 14.2.1 Release 14)", ETSI TS 136 321 V. 14.2.1., May 2017.
CATT, "BSR MAC CE", Agenda item: 10.3.1.6, 3GPP TSG-RAN WG2 Meeting #99bis, R2-1710298, pp. 1-7, Oct. 9-13, 2017, Prague, Czech Republic.
Extended European search report with supplementary European search report and the European search opinion Bsued by the European Patent Office for corresponding European Patent Application No. 17932459.5, dated Aug. 31, 2020.
Non-Final Office Action issued by the United States Patent and Trademark Office for corresponding U.S. Appl. No. 16/216,456, dated Apr. 4, 2019.
Final Office Action issued by the United States Patent and Trademark Office for corresponding U.S. Appl. No. 16/216,456, dated Oct. 9, 2019.
Non-Final Office Action issued by the United States Patent and Trademark Office for corresponding U.S. Appl. No. 16/216,456, dated Feb. 19, 2020.
Notice of Allowance issued by the United States Patent and Trademark Office for corresponding U.S. Appl. No. 16/216,456, dated Aug. 20, 2020.
Notice of Reasons for Refusal issued by the Japanese Patent Office for corresponding Japanese Patent Application No. 2019-554082, dated Nov. 2, 2021, with an English translation.
Communication pursuant to Article 94(3) EPC issued by the European Patent Office for corresponding European Patent Application No. 17 932 459.5-1215, dated Mar. 10, 2022.

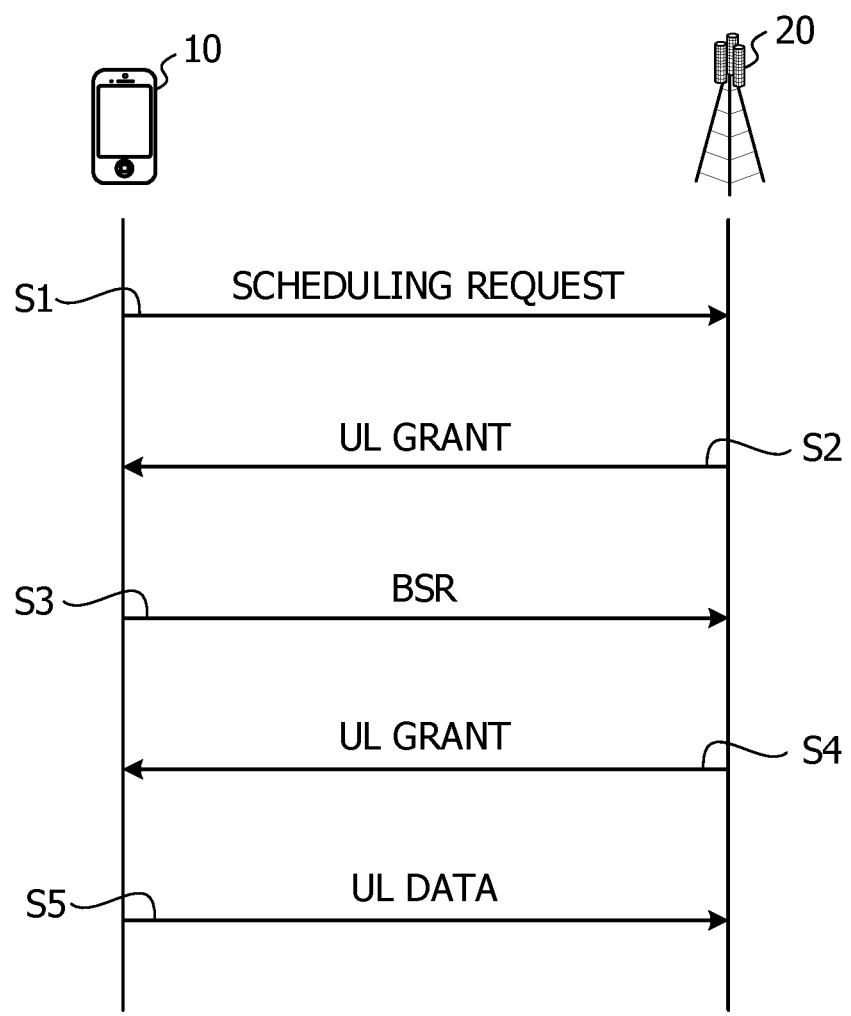

FIG. 2

| INDEX | BUFFER SIZE (BS) VALUE [bytes] | INDEX | BUFFER SIZE (BS) VALUE [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <=4940 | 63 | BS > 3000000 |

FIG. 3

| |
|---|
| BUFFER SIZE [1]=111110 |
| BUFFER SIZE [2]=111111 |
| BUFFER SIZE [3]=111110 |
| BUFFER SIZE [4]=111110 |

FIG. 6

| INDEX | BUFFER SIZE (BS) VALUE [bytes] | INDEX | BUFFER SIZE (BS) VALUE [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | ... | ... |
| 15 | 147 < BS <= 181 | ... | ... |
| 16 | 181 < BS <= 223 | ... | ... |
| 17 | 223 < BS <= 274 | ... | ... |
| 18 | 274 < BS <= 337 | ... | ... |
| 19 | 337 < BS <= 414 | ... | ... |
| 20 | 414 < BS <= 509 | ... | ... |
| 21 | 509 < BS <= 625 | ... | ... |
| 22 | 625 < BS <= 769 | ... | ... |
| 23 | 769 < BS <= 945 | ... | ... |
| 24 | 769 < BS <= 1162 | 248 | 79337316 < BS <= 84542564 |
| 25 | 1162 < BS <= 1429 | 249 | 84542564 < BS <= 90089323 |
| 26 | 1429 < BS <= 1757 | 250 | 90089323 < BS <= 96000000 |
| 27 | 1757 < BS <= 2161 | 251 | 96000000 < BS |
| 28 | 2161 < BS <= 2657 | 252 | x 1.5 |
| 29 | 2657 < BS <= 3267 | 253 | x 2.0 |
| 30 | 3267 < BS <= 4017 | 254 | x 2.5 |
| 31 | 4017 < BS <=4940 | 255 | x 3.0 |

FIG. 10

| INDEX | BUFFER SIZE (BS) VALUE [bytes] | INDEX | BUFFER SIZE (BS) VALUE [bytes] |
|---|---|---|---|
| 0 | BS = 0 | 32 | 38191 < BS <= 50275 |
| 1 | 0 < BS <= 10 | 33 | 50275 < BS <= 66184 |
| 2 | 10 < BS <= 14 | 34 | 66184 < BS <= 87126 |
| 3 | 14 < BS <= 18 | 35 | 87126 < BS <= 114696 |
| 4 | 18 < BS <= 23 | 36 | 114696 < BS <= 150989 |
| 5 | 23 < BS <= 31 | 37 | 150989 < BS <= 198766 |
| 6 | 31 < BS <= 40 | 38 | 198766 < BS <= 261662 |
| 7 | 40 < BS <= 53 | 39 | 261662 < BS <= 344460 |
| 8 | 53 < BS <= 69 | 40 | 344460 < BS <= 453458 |
| 9 | 69 < BS <= 91 | 41 | 453458 < BS <= 596947 |
| 10 | 91 < BS <= 119 | 42 | 596947 < BS <= 785840 |
| 11 | 119 < BS <= 157 | 43 | 785840 < BS <= 1034504 |
| 12 | 157 < BS <= 206 | 44 | 1034504 < BS <= 1361854 |
| 13 | 206 < BS <= 271 | 45 | 1361854 < BS <= 1792788 |
| 14 | 271 < BS <= 357 | 46 | 1792788 < BS <= 2360083 |
| 15 | 357 < BS <= 470 | 47 | 2360083 < BS <= 3106888 |
| 16 | 470 < BS <= 618 | 48 | 3106888 < BS <= 4090006 |
| 17 | 618 < BS <= 814 | 49 | 4090006 < BS <= 5384214 |
| 18 | 814 < BS <= 1071 | 50 | 5384214 < BS <= 7087951 |
| 19 | 1071 < BS <= 1410 | 51 | 7087951 < BS <= 9330804 |
| 20 | 1410 < BS <= 1856 | 52 | 9330804 < BS <= 12283367 |
| 21 | 1856 < BS <= 2444 | 53 | 12283367 < BS <= 16170216 |
| 22 | 2444 < BS <= 3217 | 54 | 16170216 < BS <= 21286987 |
| 23 | 3217 < BS <= 4235 | 55 | 21286987 < BS <= 28022867 |
| 24 | 4235 < BS <= 5574 | 56 | 28022867 < BS <= 36890195 |
| 25 | 5574 < BS <= 7338 | 57 | 36890195 < BS <= 48563427 |
| 26 | 7338 < BS <= 9660 | 58 | 48563427 < BS <= 63930442 |
| 27 | 9660 < BS <= 12717 | 59 | 63930442 < BS <= 84160070 |
| 28 | 12717 < BS <= 16741 | 60 | 84160070 < BS <= 110790997 |
| 29 | 16741 < BS <= 22038 | 61 | 110790997 < BS <= 145848796 |
| 30 | 22038 < BS <= 29011 | 62 | 145848796 < BS <= 192000000 |
| 31 | 29011 < BS <= 38191 | 63 | 192000000 < BS |

FIG. 12

| LCG | BS MAX VALUE [bytes] |
|---|---|
| LCG[0] | 3000000 |
| LCG[1] | 192000000 |
| LCG[2] | 3000000 |
| LCG[3] | 3000000 |
| LCG[4] | 3000000 |
| LCG[5] | 3000000 |

FIG. 14

| INDEX | BUFFER SIZE (BS) VALUE [bytes] | INDEX | BUFFER SIZE (BS) VALUE [bytes] |
|---|---|---|---|
| 0 | BS = 0 | 32 | 68 < BS <= 72 |
| 1 | 0 < BS <= 10 | 33 | 72 < BS <= 77 |
| 2 | 10 < BS <= 11 | 34 | 77 < BS <= 82 |
| 3 | 11 < BS <= 12 | 35 | 87 < BS <= 93 |
| 4 | 12 < BS <= 13 | 36 | 93 < BS <= 99 |
| 5 | 13 < BS <= 13 | 37 | 99 < BS <= 105 |
| 6 | 13 < BS <= 14 | 38 | 105 < BS <= 112 |
| 7 | 14 < BS <= 15 | 39 | 112 < BS <= 120 |
| 8 | 15 < BS <= 16 | 40 | 120 < BS <= 128 |
| 9 | 16 < BS <= 17 | 41 | 128 < BS <= 136 |
| 10 | 17 < BS <= 18 | 42 | 136 < BS <= 145 |
| 11 | 18 < BS <= 19 | 43 | 145 < BS <= 154 |
| 12 | 19 < BS <= 21 | 44 | 154 < BS <= 164 |
| 13 | 21 < BS <= 22 | 45 | 164 < BS <= 175 |
| 14 | 22 < BS <= 23 | ... | ... |
| 15 | 23 < BS <= 25 | ... | ... |
| 16 | 25 < BS <= 26 | ... | ... |
| 17 | 26 < BS <= 28 | ... | ... |
| 18 | 28 < BS <= 30 | ... | ... |
| 19 | 30 < BS <= 32 | ... | ... |
| 20 | 32 < BS <= 34 | ... | ... |
| 21 | 34 < BS <= 36 | ... | ... |
| 22 | 36 < BS <= 38 | ... | ... |
| 23 | 38 < BS <= 41 | ... | ... |
| 24 | 41 < BS <= 44 | 248 | 61529851 < BS <= 65566768 |
| 25 | 44 < BS <= 46 | 249 | 65566768 < BS <= 69868543 |
| 26 | 46 < BS <= 49 | 250 | 69868543 < BS <= 74452553 |
| 27 | 49 < BS <= 53 | 251 | 74452553 < BS <= 79337316 |
| 28 | 53 < BS <= 56 | 252 | 79337316 < BS <= 84542564 |
| 29 | 56 < BS <= 60 | 253 | 84542564 < BS <= 90089323 |
| 30 | 60 < BS <= 64 | 254 | 90089323 < BS <= 96000000 |
| 31 | 64 < BS <= 68 | 255 | 96000000 < BS |

FIG. 15

| INDEX | BUFFER SIZE (BS) VALUE [bytes] | INDEX | BUFFER SIZE (BS) VALUE [bytes] |
|---|---|---|---|
| 0 | BS = 0 | 32 | 77 < BS <= 82 |
| 1 | 0 < BS <= 10 | 33 | 82 < BS <= 88 |
| 2 | 10 < BS <= 11 | 34 | 88 < BS <= 94 |
| 3 | 11 < BS <= 12 | 35 | 94 < BS <= 101 |
| 4 | 12 < BS <= 13 | ... | ... |
| 5 | 13 < BS <= 14 | ... | ... |
| 6 | 14 < BS <= 15 | 230 | 52134078 < BS <= 55793391 |
| 7 | 15 < BS <= 16 | 231 | 55793391 < BS <= 59709552 |
| 8 | 16 < BS <= 17 | 232 | 59709552 < BS <= 63900591 |
| 9 | 17 < BS <= 18 | 233 | 63900591 < BS <= 68385801 |
| 10 | 18 < BS <= 19 | 234 | 68385801 < BS <= 73185829 |
| 11 | 19 < BS <= 20 | 235 | 73185829 < BS <= 78322773 |
| 12 | 20 < BS <= 22 | 236 | 78322773 < BS <= 83820282 |
| 13 | 22 < BS <= 23 | 237 | 83820282 < BS <= 89703663 |
| 14 | 23 < BS <= 25 | 238 | 89703663 < BS <= 96000000 |
| 15 | 25 < BS <= 26 | 239 | 96000000 < BS |
| 16 | 26 < BS <= 28 | 240 | Reserved |
| 17 | 28 < BS <= 30 | 241 | Reserved |
| 18 | 30 < BS <= 32 | 242 | Reserved |
| 19 | 32 < BS <= 34 | 243 | Reserved |
| 20 | 34 < BS <= 37 | 244 | Reserved |
| 21 | 37 < BS <= 39 | 245 | Reserved |
| 22 | 39 < BS <= 42 | 246 | Reserved |
| 23 | 42 < BS <= 45 | 247 | Reserved |
| 24 | 45 < BS <= 48 | 248 | Reserved |
| 25 | 48 < BS <= 51 | 249 | Reserved |
| 26 | 51 < BS <= 55 | 250 | Reserved |
| 27 | 55 < BS <= 59 | 251 | Reserved |
| 28 | 59 < BS <= 63 | 252 | Reserved |
| 29 | 63 < BS <= 67 | 253 | Reserved |
| 30 | 67 < BS <= 72 | 254 | Reserved |
| 31 | 72 < BS <= 77 | 255 | Reserved |

WIRELESS TERMINAL, WIRELESS BASE STATION, AND TRANSMISSION METHOD OF BUFFER STATUS REPORT

CROSS-REFERENCE TO RELATED APPLICATION

This application is a continuation application of U.S. application Ser. No. 16/216,456 filed on Dec. 11, 2018, which is a continuation application of International Application PCT/JP2017/040996 filed on Nov. 14, 2017 and designated the U.S., the entire contents of which are incorporated herein by reference.

FIELD

The present invention relates to a wireless terminal, a wireless base station, and a transmission method of a buffer status report.

BACKGROUND

In recent years, in a wireless communication system (also referred to as a mobile communication system) such as a portable phone system (cellular system), the next generation wireless communication technology has been discussed in order to more increase the speed and the capacity of wireless communication. For example, in the 3rd generation partnership project (3GPP) being a standard organization, developing specifications of the communication standard referred to as long-term evolution (LTE) or the communication standard referred to as LTE-Advanced (LTE-A) which has been based on the wireless communication technology of LTE has been already performed. In addition, studying enhancement of the function has been continuously carried out. For example, the discussion about standardization of the fifth-generation mobile communication system (also referred to as a 5G system) that realizes the contents of an operational scenario and technical requirements presented from the international telecommunication union radio communication sector (ITU-R) has been carried out.

In the wireless communication system as described above, a wireless terminal transmits uplink (also referred to as a UL) scheduling information, for example, a buffer status report (also referred to as a BSR) of the wireless terminal (also referred to as a terminal, a user terminal, or a mobile station), to a wireless base station such that the wireless terminal is capable of assisting that a wireless base station (also referred to as a base station) performs scheduling of wireless resources with higher efficiency. Regarding transmission of a buffer status report (BSR) of the wireless terminal, for example, information is transmitted based on the volume of data stored in a transmission buffer of the wireless terminal.

From a viewpoint of transmission efficiency of the BSR, the wireless terminal performs compression of information volume by converting the volume of data stored in the transmission buffer (also referred to as a buffer) into an index value (also referred to as a BSR index). The index value is obtained by quantizing the volume of the data in a predetermined granularity. Therefore, a buffer status report index table (also referred to as a BSR index table) is provided in the wireless terminal and the wireless base station. In the BSR index table, a range from the minimum value of the BSR to the maximum value thereof (for example, a range from 0 bytes to 150000 bytes) is divided into a plurality of subranges, and the index value of each subrange corresponds to a range of a data volume (also referred to as a buffer value or a buffer size) in the buffer. Any one (for example, the last BSR index) of a plurality of BSR indices in the BSR index table is correlated with a state where the buffer value exceeds the maximum value.

The wireless terminal identifies an index value (also referred to as a BSR index, a BSR index value, or a BSR value) associated with a subrange corresponding to a data volume (also referred to as a buffer value, a buffer size, or data available for transmission) in the buffer, in accordance with the above-described BSR index table. The wireless terminal transmits a BSR including the identified BSR index. The wireless base station receives a BSR from the wireless terminal, and thus may recognize the amount of wireless resources that a wireless terminal needs to be allocated, and is able to perform suitable scheduling. The wireless terminal may actively request allocation of wireless resources from the wireless base station.

The transmission of the BSR from the wireless terminal is triggered in accordance with a period designated by setting information transmitted from the wireless base station, for example. The wireless base station estimates a buffer size of the wireless terminal based on the BSR from the wireless terminal and updates the estimated value of the buffer size of the wireless terminal based on, for example, the amount of wireless resources allocated in scheduling. The BSR may be transmitted from the wireless terminal by a trigger other than the period designated by setting information transmitted from the wireless base station. For example, it is assumed that the wireless terminal transmits a BSR to the wireless base station when a packet of an uplink signal is generated, or in a case where the number of padding bits included in the packet is equal to or greater than a predetermined value.

Examples of the related art include PTL 1: Japanese Laid-open Patent Publication No. 2016-181925, NPL 1: 3GPP TS36.211 V14.3.0 (2017 June), NPL 2: 3GPP TS36.212 V14.3.0 (2017 June), NPL 3: 3GPP TS36.213 V14.3.0 (2017 June), NPL 4: 3GPP TS36.214 V14.2.0 (2017 March), NPL 5: 3GPP TS36.300 V14.3.0 (2017 June), NPL 6: 3GPP TS36.321 V14.3.0 (2017 June), NPL 7: 3GPP TS36.322 V14.0.0 (2017 March), NPL 8: 3GPP TS36.323 V14.3.0 (2017 June), NPL 9: 3GPP TS36.331 V14.3.0 (2017 June), NPL 10: 3GPP TS36.413 V14.3.0 (2017 June), NPL 11: 3GPP TS36.423 V14.3.0 (2017 June), NPL 12: 3GPP TS37.324 V0.2.0 (2017 September), NPL 13: 3GPP TS37.340 V1.0.0 (2017 September), NPL 14: 3GPP TS36.425 V14.0.0 (2017 March), NPL 15: 3GPP TS38.201 V1.0.0 (2017 September), NPL 16: 3GPP TS38.202 V1.0.0 (2017 September), NPL 17: 3GPP TS38.211 V1.0.0 (2017 September), NPL 18: 3GPP TS38.212 V1.0.0 (2017 September), NPL 19: 3GPP TS38.213 V1.0.0 (2017 September), NPL 20: 3GPP TS38.214 V1.0.0 (2017 September), NPL 21: 3GPP TS38.215 V1.0.0 (2017 September), NPL 22: 3GPP TS38.300 V1.0.0 (2017 September), NPL 23: 3GPP TS38.321 V1.0.0 (2017 September), NPL 24: 3GPP TS38.322 V1.0.0 (2017 September), NPL 25: 3GPP TS38.323 V0.3.0 (2017 August), NPL 26: 3GPP TS38.331 V0.0.5 (2017 August), NPL 27: 3GPP TS38.401 V0.2.0 (2017 July), NPL 28: 3GPP TS38.410 V0.4.0 (2017 September), NPL 29: 3GPP TS38.413 V0.3.0 (2017 August), NPL 30: 3GPP TS38.420 V0.2.0 (2017 July), NPL 31: 3GPP TS38.423 V0.2.0 (2017 June), NPL 32: 3GPP TS38.470 V0.3.0 (2017 September), NPL 33: 3GPP TS38.473 V0.3.0 (2017 September), NPL 34: 3GPP TR38.801 V14.0.0 (2017 March), NPL 35: 3GPP TR38.802 V14.1.0 (2017 June), NPL 36: 3GPP TR38.803 V14.1.0 (2017 June), NPL 37:

3GPP TR38.804 V14.0.0 (2017 March), NPL 38: 3GPP TR38.900 V14.3.1 (2017 July), NPL 39: 3GPP TR38.912 V14.0.0 (2017 March), NPL 40: 3GPP TR38.913 V14.3.0 (2017 June).

SUMMARY

According to an aspect of the disclosure, a wireless terminal for a wireless communication, the wireless terminal includes: a memory that includes a buffer configured to store uplink data, wherein the uplink data is configured to be transmitted; and a controller configured to transmit a buffer status report, the buffer status report including a first index, wherein the first index is one of a plurality of buffer status indices and corresponds to a buffer size indicating a size of the uplink data stored in the buffer, wherein the memory is configured to store a buffer status table in which a range from a minimum value of the buffer to a maximum value of the buffer is divided into a plurality of subranges, the plurality of subranges being associated with a part of the plurality of buffer status indices, and a rest of the plurality of buffer status indices are associated with one or more reserved fields.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a sequence of BSR transmission in a wireless communication system according to Example 1.

FIG. 2 is a diagram illustrating an example of a BSR index table according to Example 1.

FIG. 3 is a diagram illustrating an example of a buffer status report according to Example 1.

FIG. 6 is a diagram illustrating an example of a BSR index table according to Example 2.

FIG. 10 is a diagram illustrating an example of a BSR index table according to Example 3.

FIG. 12 is a diagram illustrating an example of setting information regarding a correspondence relation between a conversion table and a LCG according to Example 3.

FIG. 14 illustrates a content example of the BSR index table in a case where the BSR index is extended to 8 bits.

FIG. 15 is a diagram illustrating a content example of a BSR index table according to Example 4.

DESCRIPTION OF EMBODIMENTS

Figure 4:
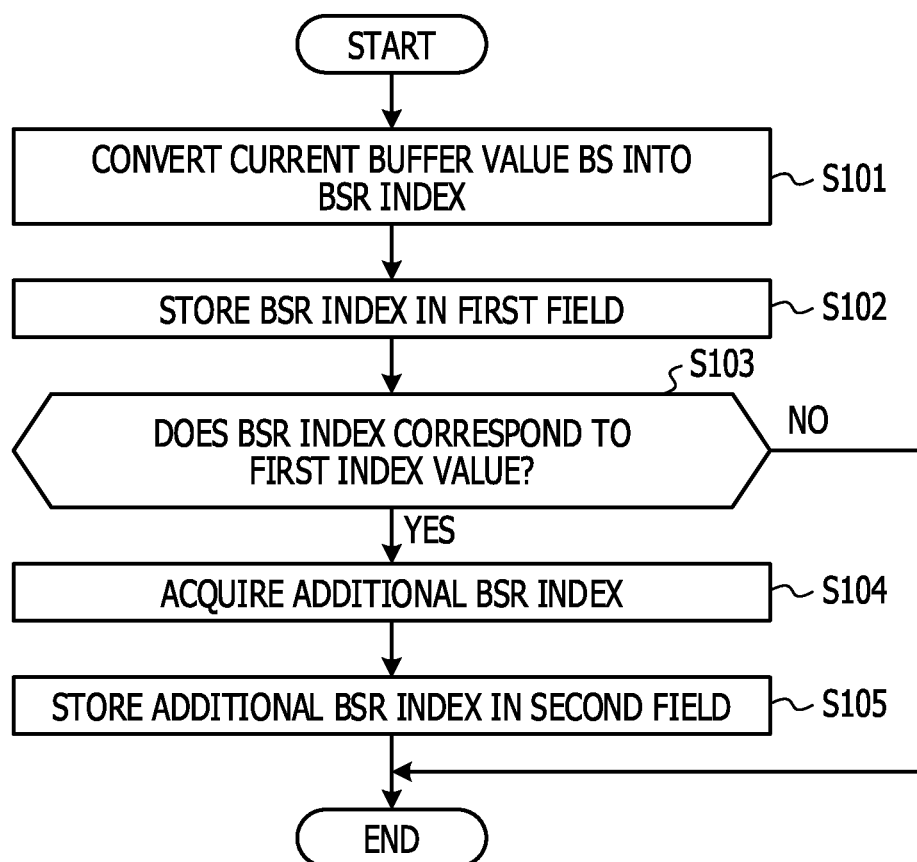
FIG. 4 is a diagram illustrating an example of a flow of processing of a wireless terminal in a BSR transmission sequence according to Example 1.

In the next generation mobile communication system subsequent to the fifth-generation mobile communication system, for example, providing a service such as a tactile communication and augmented reality, which desires transmission of a super high speed and large capacity which are higher than the levels in the related art is expected. For realizing such a service, in the fifth-generation mobile communication system, an enhanced mobile broadband (eMBB) being a super high speed and large capacity transmission service is set as one of functional requirements. For example, in the fifth-generation mobile communication system, it is aimed that a communication speed exceeding 10 Gbps ($10 \times 10^{12}$ bps) and large capacity as much as about 1000 times capacity in the fourth-generation mobile communication system (may also be referred to as LTE) are realized.

However, the discussion in the fifth-generation mobile communication system is just started. Thus, it is considered that the basic system design is mainly discussed for now. Therefore, a technology which is properly implemented in an operator has not sufficiently examined yet. For example, discussion about the issue of BSR implementation in realizing eMBB has not progressed much.

Considering the above-described circumstances, an object of the technology in the disclosure is to provide a wireless terminal, a wireless base station, a wireless communication system, and a transmission method of a buffer status report (BSR), in which it is possible to solve the issue of BSR implementation in the fifth-generation mobile communication system.

Example 1

Hereinafter, examples of a wireless terminal, a wireless base station, a wireless communication system, and a wireless communication method disclosed in this application will be described in detail with reference to the drawings. The examples which will be described below are not limited to the technology in the disclosure. The examples which will be described below may be appropriately combined and conducted. Here, details of all NPL 1 to NPL 40 are incorporated herein by reference.

As described above, the discussion in the fifth-generation mobile communication system is just started. Therefore, for example, discussion about the issue of BSR implementation which may occur in realizing enhanced mobile broadband (eMBB), has not progressed much.

The inventors of the present invention independently examined problems in implementation which might occur in realizing the fifth-generation mobile communication system. As a result, the inventors found that, in an aspect of the fifth-generation mobile communication system, the frequency of generating uplink data might be significantly increased in a wireless terminal (may also be referred to as a terminal, a user terminal, or user equipment) in which using a super high speed and large capacity transmission service was supposed, by significantly improving a data transmission rate in comparison to that in the related art. For example, it may be supposed that pieces of data from various devices such as sensors, which are associated with the wireless terminal are frequently generated and stored in a transmission buffer. However, uplink data is stored in the transmission buffer of the wireless terminal until a timing at which uplink wireless resources are allocated arrives. Thus, the volume of uplink data (may also be referred to as a buffer value, a buffer size, data available for transmission, or data volume) which is stored in the transmission buffer of the wireless terminal and is not transmitted yet may significantly increase. The buffered volume may be reduced by the uplink data being transmitted in accordance with the timing at which the uplink wireless resources are allocated.

In this manner, in the aspect of the fifth-generation mobile communication system, the volume of uplink data (may also be referred to as a buffer value, a buffer size, data available for transmission, or data volume) stored in the transmission buffer of the wireless terminal may increase or decrease rapidly. Therefore, if the granularity of buffer values correlated with index values (may also be referred to as BSR indices) defined in a BSR index table is set as roughly as that in the fourth-generation mobile communication system, a circumstance in which accuracy of the estimated value (may also be referred to as a buffer estimation value) of the buffer size of the wireless terminal in the wireless base station (may also be referred to as a base station or a gNB below) decreases may occur. In other words, a difference between a buffer estimation value in the wireless base station and the actual buffer size in the wireless terminal becomes greater, and thus it is difficult to realize the best uplink scheduling.

For example, in the fourth-generation mobile communication system, a buffer value in a range from 0 bytes to 150000 bytes (=150 KBytes) is expressed at 63 steps with the first to 63th BSR indices of a 6-bit BSR index (that is, $2^6=64$ BSR indices) (for example, see 3GPP TS36.321 V14.3.0-Table 6.1.3.1-10). The last BSR index (that is, the 64th BSR index) indicates a buffer value exceeding 150000 bytes as the maximum value of the above-described range. If the BSR index having such a granularity is applied even in the fifth-generation mobile communication system, the buffer value of the wireless terminal easily exceeds 150000 bytes as the maximum value by using the enhanced mobile broadband (eMBB), for example. As a result, in a buffer status report, the 64th BSR index is often used.

However, the 64th BSR index of "63" in the related art only indicates that a buffer value BS exceeds the maximum value (150000 bytes) of a buffer, which is defined in a BSR index table, and there is nothing to do with indicating the extent to which the degree of the buffer value exceeds the maximum value. Therefore, accuracy of the buffer estimation value in the wireless base station greatly decreases by a BSR having a very large granularity, for example, exceeding the maximum value.

Even in a case where, simply, the maximum value of the buffer value correlated with a BSR index is largely set in order to handle this circumstance, the granularity between the buffer values correlated with the BSR indices becomes rough, and thus it may be difficult to realize the best uplink scheduling.

In a case where the number of bits of the BSR index is simply set to increase in order to reduce the granularity between the buffer values correlated with the BSR indices, a new circumstance in which transmission efficiency of the buffer status report decreases may occur. Thus, from a viewpoint of transmission efficiency of the buffer status report, there is a limit on an increase of the number of bits of the BSR index to some extents in the fifth-generation mobile communication system.

From the above circumstances, there is a limit on an increase of the maximum value of the buffer value correlated with the BSR index to some extents. Therefore, it is supposed that the buffer value of the wireless terminal in the fifth-generation mobile communication system exceeds the maximum value in many cases. In a case where the buffer value exceeds the maximum value, the accuracy of the buffer estimation value of the terminal in the wireless base station decreases by using the BSR indices indicating buffer values having a very large step size.

In this manner, with the BSR status report having a rough granularity, estimation accuracy regarding the buffer estimation value of the wireless terminal by the wireless base station decreases, and thus causing the difficulty in the best uplink scheduling. Therefore, it is concerned that performance of a super high speed and large capacity transmission service of an uplink in the fifth-generation mobile communication system may be degraded by applying the BSR transmission method in the related art.

According to the aspect of the disclosure, a novel BSR transmission technology is provided in which buffer estimation in the wireless base station may follow variation in a buffer status in the wireless terminal even in a case where the volume of uplink data which is stored in the transmission buffer of the wireless terminal and is not transmitted yet may rapidly increase or decrease. The following is desirably noted. The above circumstances may be found in a case where the fifth-generation mobile communication system has been examined from one aspect. Other circumstances may be found in a case where the communication system has been examined from other aspects. In other words, the features and advantages of the present invention are not limited to applications for solving the above-mentioned circumstances, but may be grasped through embodiments which will be described below.

The configuration of the embodiment which will be described below represents one example for embodying the technical idea of the present invention. It is not intended to limit the present invention to the configuration of this embodiment. The configuration of the embodiment may be equally applied to other embodiments falling within the scope of the claims. For example, regarding various terms such as a BSR, it is also considered that the terms may be changed when the specifications of the fifth-generation mobile communication system are set after now. It is also considered that the terms may be changed in a mobile communication system subsequent to the fifth-generation mobile communication system. In the following disclosure, an example of processing in a medium access control (MAC) layer is used as an example of a status report of the transmission buffer of the wireless terminal, but it is desirably noted that there is no intention to limit the disclosure to the example.

In a wireless communication system 1 according to Example 1, in a transmission sequence of a buffer status report (BSR), in which a wireless base station is notified of the size (also referred to as a buffer value) of uplink data which has been stored in a buffer of a wireless terminal and is not transmitted yet, a new second field is added to the BSR in accordance with the buffer value of the wireless terminal, in addition to a first field for storing a BSR index value. Thus, it is possible to notify the wireless base station of the buffer value of the wireless terminal with high accuracy, by using the first field and the second field of the buffer status report.

FIG. 1 is a diagram illustrating an example of a sequence of BSR transmission in the wireless communication system 1 according to Example 1. As illustrated in FIG. 1, the wireless communication system 1 includes a wireless terminal 10 and a wireless base station 20.

In a case where uplink data which is to be transmitted to the wireless base station 20 is generated, the wireless terminal 10 may transmit a signal (SR signal: scheduling request) for requesting allocation of wireless resources for an uplink from the wireless base station 20 (S1).

The wireless base station 20 may receive the request (SR signal) from the wireless terminal 10. The wireless base station checks whether or not a wireless resource capable of being allocated is provided, for example. If there is no terminal to which wireless resources are to be preferentially allocated, the wireless base station may allocate wireless resource to the terminal 10 as a transmission source of the SR signal. The wireless base station 20 transmits an uplink grant (also referred to as an UL grant or an UL scheduling grant) indicating wireless resources which have been allocated to the wireless terminal 10, to the wireless terminal 10 (S2). The wireless base station 20 does not have to transmit the uplink grant.

The wireless terminal 10 may receive the uplink grant from the wireless base station 20. Then, the wireless terminal may transmit the latest buffer status report (BSR) to the wireless base station 20 by using the wireless resources indicated by the uplink grant (S3). The BSR is transmitted at various timings. As described above, the wireless terminal may perform the BSR transmission sequence based on a transmission period designated by setting information from the base station 20. The wireless terminal may perform the BSR transmission sequence in a case where a predetermined event is detected within a predetermined time from a certain time point as a starting point.

The buffer status report (BSR) according to Example 1 includes a first field for storing a BSR index corresponding to the size (buffer value) of uplink data which has been stored in a transmission buffer and is not transmitted yet. The buffer status report (BSR) may include a second field for storing an additional index value in a case where the BSR index stored in the first field has a predetermined first index value. The additional BSR index may be set to indicate a buffer value along with the BSR index stored in the first field. In other words, in a case where the BSR index stored in the first field has a predetermined first index value, the wireless base station is notified of the buffer value of the wireless terminal by the BSR index (may also be referred to as a first BSR index) and the additional BSR index (may also be referred to as a second BSR index).

In S3, the wireless terminal 10 may acquire the volume (buffer value) of uplink data which has been stored in the transmission buffer and is not transmitted yet, and convert the buffer value into a BSR index in accordance with a BSR index table.

FIG. 2 is a diagram illustrating an example of the BSR index table according to Example 1. In the BSR index table illustrated in FIG. 2, a range from 0 bytes to 3000000 bytes (=3 Mbytes=3000 Kbytes) is divided into ranges of 63 steps, and 63 BSR indices (that is, 0 to 62) are respectively associated with the ranges. For example, a range of "2439678<BS<=3000000" is associated with a BSR index having an index value of "62". A buffer value BS belonging to the range of "2439678<BS<=3000000" is any value in a range of being greater than 2439678 bytes and equal to or smaller than 3000000 bytes. The last BSR index (that is, 63) means a buffer value BS exceeding the maximum value (may also be referred to as a maximum buffer value) of a buffer, which is defined in the BSR index table. In the example in FIG. 2, the maximum buffer value defined in the BSR index table is "3000000 bytes". The values in the BSR index table illustrated in FIG. 2 are just examples, and Example 1 is not limited to the values.

It is assumed that the wireless terminal 10 and the wireless base station 20 in the wireless communication system 1 according to Example 1 have the BSR index table as illustrated in FIG. 2.

FIG. 3 is a diagram illustrating an example of the buffer status report (BSR) according to Example 1. The buffer status report (BSR) illustrated in FIG. 3 stores a BSR index indicating a buffer value, for each of one or more logical channel groups (LCGs). In the example in FIG. 3, the buffer status report (BSR) includes one or more first fields for storing a BSR index corresponding to any of one or more LCGs.

In the example in FIG. 3, the buffer status report (BSR) may include a plurality of fields including the first field for storing a BSR index, for three LCGs of LCG [0], LCG [1], and LCG [2]. That is, the buffer status report (BSR) in FIG. 3 includes four fields from BufferSize [1] to BufferSize [4], as fields for storing information indicating buffer values for the LCGs. In other words, in the buffer status report (BSR) in FIG. 3, for three LCGs (LCG [0], LCG [1], and LCG [2]), four fields in total (BufferSizes [1] to [4]) of three first fields and one second field are stored. The number of fields (first field and second field) provided in the buffer status report (BSR) according to the example is not limited thereto, and may vary.

For example, first fields may be assigned to one or more LCGs in which the presence of the first field is indicated by a header portion T101, in ascending order of the LCG numbers. For example, BufferSize [1] may be used for the first LCG [0], as the first field for storing a BSR index corresponding to the buffer value for LCG [0]. In the example in FIG. 3, BufferSize [1] as the first field of LCG [0] stores the value of "111110". The value of "111110" is a value expressed by a binary number, and means "62" when the value of "111110" is converted into a decimal number. According to the BSR index table illustrated in FIG. 2, the BSR index of "62" means that the buffer value exceeds 2439678 bytes and is equal to or smaller than 3000000 bytes.

BufferSize [2] may be used as the first field for storing a BSR index corresponding to the buffer value for the second LCG [1]. In the example in FIG. 3, BufferSize [2] as the first field of LCG [1] stores the value of "111111". The value of "111111" is a value expressed by a binary number, and means "63" when the value of "111111" is converted into a decimal number. According to the BSR index table illustrated in FIG. 2, the BSR index of "63" means that the buffer value exceeds the maximum value (3000000 bytes) of the buffer, which is defined in the BSR index table.

Therefore, in a case where the BSR index corresponds to a value (for example, "63") (may also be referred to as a first index value) indicating a buffer value which exceeds the maximum buffer value, the second field for storing an additional index value (may also be referred to as a second BSR index) may be assigned. In the example in FIG. 3, since the BSR index stored in the first field (BufferSize [2]) of LCG [1] corresponds to the first index value, BufferSize [3] is assigned to LCG [1], as the second field for storing an additional index.

BufferSize [3] as the second field of LCG [1] stores the value of "111110". The value of "111110" is a value expressed by a binary number, and means "62" when the value of "111110" is converted into a decimal number. According to the BSR index table illustrated in FIG. 2, the BSR index of "62" means that the buffer value exceeds 2439678 bytes and is equal to or smaller than 3000000 bytes.

In the example of the buffer status report (BSR) depicted in FIG. 3, BufferSize [2] as the first field and BufferSize [3] as the second field are assigned to LCG [1]. With the first field and the second field, it is possible to send a buffer value exceeding the maximum value (may also be referred to as the maximum buffer value) of the buffer, which is defined in the BSR index table, to the wireless base station 20. In the example in FIG. 3, the BSR index (may also be referred to as the first BSR index) stored in the first field indicates that the buffer value BS of the wireless terminal 10 exceeds 3000000 bytes. The additional BSR index (may also be referred to as the second BSR index) stored in the second field indicates that a buffer value BS2 corresponding to the amount of the buffer value exceeding 3000000 bytes is in the range of 2439678 bytes<BS2<=3000000 bytes. That is, it is understood that the buffer value BS for LCG [1] is indicated by a value obtained by adding the maximum value (3000000 byte) to the buffer value BS2 corresponding to the amount of the buffer value exceeding, and is in a range of 5439678 bytes<BS<=6000000 bytes.

BufferSize [4] may be used as the first field for the last third LCG [2]. In the example in FIG. 3, the value of "111110" is stored in BufferSize [4] as the first field for LCG [2]. The value of "111110" is a value expressed by a binary number, and is "62" if the value of "111110" is converted into a decimal number. According to the BSR index table illustrated in FIG. 2, the BSR index of "62" means that the buffer value BS of the wireless terminal 10 exceeds 2439678 bytes and is equal to or smaller than 3000000 bytes.

The wireless base station 20 which has received the buffer status report (BSR) from the wireless terminal 10 may recognize a LCG for which a BSR index is stored, by referring to the header portion T101 of a BSR. In other words, the wireless base station 20 may recognize the number of first fields provided in a body portion T102 of the BSR, based on the header portion T101 of the BSR.

The wireless base station 20 may acquire an estimated value (may also be referred to as a buffer estimation value) of a buffer value for each LCG in the wireless terminal 10 in a manner that the wireless base station acquires a BSR index from the first field correlated with each LCG and converts the BSR index into a buffer value in accordance with the BSR index table illustrated in FIG. 2.

In a case where the BSR index acquired from the first field corresponds to the first index value (for example, maximum value (3000000 bytes) of the BSR index table), the wireless base station 20 acquires the second field for the LCG correlated with the first field, from the buffer status report (BSR) received from the wireless terminal 20. The wireless base station 20 converts a second BSR index (may also be referred to as an additional BSR index or an extended BSR index) stored in the second field, into a buffer value in accordance with the BSR index table, and thus may recognize an excess buffer amount of the LCG.

The wireless base station 20 may recognize the amount of wireless resources that a wireless terminal 10 (or an LCG of the wireless terminal 10) needs to be allocated, by updating the buffer estimation value of the wireless terminal 10 based on the latest BSR from the wireless terminal 10. Thus, it is expected that suitable scheduling is performed. The wireless base station 20 may perform scheduling of wireless resources based on the latest buffer estimation value and the like. As a result, in a case where the wireless base station allocates wireless resources to the wireless terminal 10, the wireless base station transmits an uplink grant (ULgrant) signal (S4).

In S4, the wireless base station 20 may transmit an uplink grant signal indicating the amount of wireless resources allocated for each LCG in the wireless terminal 10. The uplink grant signal may include information indicating the amount of wireless resources allocated for each of one or more LCGs.

The wireless terminal 10 may receive the uplink grant from the wireless base station 20. The wireless terminal obtains data (may also be referred to as UL (Uplink) data) the size of which corresponding to the allocated data volume (also referred to as the allocated amount), from the transmission buffer. Then, the wireless terminal may transmit data to the base station 20 using the allocated wireless resource (S5).

In the BSR transmission sequence according to Example 1, even in a case where the buffer value notified by a BSR exceeds the maximum value (for example, 3000000 bytes) in the BSR index table, the wireless base station 20 may estimate the accurate buffer value by a notification of the buffer value using both the first field and the second field.

Next, an example of a flow of processing of the wireless terminal 10 in the BSR transmission sequence according to Example 1 will be described.

FIG. 4 is a diagram illustrating an example of a flow of processing of a wireless terminal 10 in a BSR transmission sequence according to Example 1. The flow of the processing illustrated in FIG. 4 may be performed, for example, when the wireless terminal 10 acquires a BSR index in an LCG unit. In other words, in a case where it is assumed that the wireless terminal acquires BSR indices for a plurality of LCGs, the wireless terminal 10 may perform the processing illustrated in FIG. 4, for each LCG. For easy descriptions, descriptions will be made on the assumption that the wireless terminal 10 performs the processing illustrated in FIG. 4. The wireless terminal 10 may include one or more processor circuits as the subject that performs the processing.

Firstly, the wireless terminal 10 may convert the current buffer value BS into a BSR index (S101). In S101, the wireless terminal 10 may acquire the size (may also be referred to as a buffer value, a buffer size value, or a BS value) of uplink data which is stored in the transmission buffer of a logical channel (LC) belonging to an LCG as a processing target and is not transmitted yet. Then, the wireless terminal may convert the BS value into a BSR index in accordance with a BSR index table. In S101, in a case where a plurality of logical channels belonging to the LCG as the processing target is provided, the wireless terminal 10 may set a value obtained by summing buffer values of the logical channels, as the BS value.

The wireless terminal 10 may store the BSR index (may also be referred to as a first BSR index) acquired in S101, in the first field corresponding to the LCG as the processing target (S102).

The wireless terminal 10 may determine whether the BSR index acquired in S101 corresponds to the first index value (S103). The first index value according to Example 1 corresponds to, for example, the last BSR index in the BSR index table. In the example in FIG. 2, the last BSR index corresponds to a BSR index of "63" meaning that the buffer value BS exceeds the maximum value (3000000 bytes) of the buffer, which is defined in the BSR index table. In a case where the BSR index is expressed by a binary number of six digits, the first index value of "63" is expressed by a bit string in which all six digits are "1".

In S103, in a case where the BSR index acquired in S101 is equal to the first index, the wireless terminal 10 may determine that the BSR index corresponds to the first index value (YES in S103). In S103, in a case where the BSR index acquired in S101 is not equal to the first index value, the wireless terminal 10 may determine that the BSR index does not correspond to the first index value (NO in S103).

In a case where the wireless terminal determines that the BSR index corresponds to the first index value (YES in S103), the wireless terminal 10 acquires an additional BSR index (may also be referred to as a second BSR index) (S104). In S104, the wireless terminal 10 may acquire an excess buffer value BS2 corresponding to the amount of the buffer exceeding the maximum buffer value, by subtracting the maximum buffer value (for example, 3000000 bytes) defined in the BSR index table from the buffer value BS. For example, in a case where the buffer value BS is "6000000 bytes", the excess buffer value BS2 is "3000000 bytes" (=6000000 bytes-3000 bytes).

In S104, the wireless terminal 10 may acquire the additional BSR index by selecting a BSR index corresponding to the excess buffer value BS2 with reference to the BSR index table. For example, in a case where the excess buffer value BS2 is "3000000 bytes", according to the BSR index table illustrated in FIG. 2, the additional BSR corresponding to the excess buffer value BS2 is "62".

In a case where the wireless terminal has performed the process of S104, the wireless terminal 10 stores the additional BSR index in a second field corresponding to the LCG as the processing target (S105).

In a case where it is determined, in S103, that the BSR index (may also be referred to as the first BSR index) does not correspond to the first index value (NO in S103), the wireless terminal 10 may skip the processes of S104 and S105 without assigning the second field for the LCG as the processing target.

The above descriptions are an example of the flow of the processing of the wireless terminal 10 in the BSR transmission sequence according to Example 1. Next, a flow of processing of the wireless base station 20 will be described.

Figure 5:
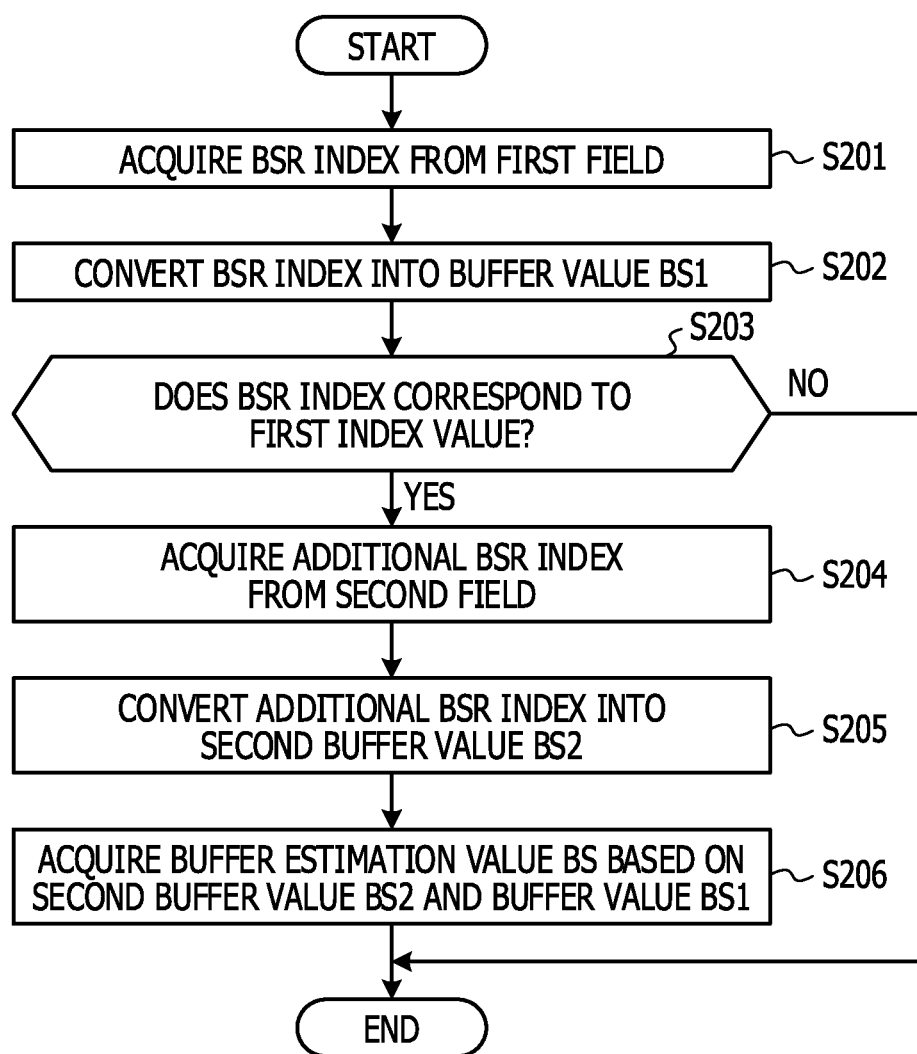
FIG. 5 is a diagram illustrating a flow of processing of a wireless base station 20 in the BSR transmission sequence according to Example 1.

FIG. 5 is a diagram illustrating a flow of the processing of the wireless base station 20 in the BSR transmission sequence according to Example 1. The flow of the processing illustrated in FIG. 5 may be performed, for example, when the wireless base station 20 refers to the first field of an LCG unit from a BSR received from the wireless terminal 10. In other words, in a case where the BSR received from the wireless terminal 10 includes one or more fields for each of a plurality of LCGs, the wireless terminal 10 may perform the processing illustrated in FIG. 5 for each LCG. For easy descriptions, descriptions will be made on the assumption that the wireless base station 20 performs the processing illustrated in FIG. 5. The wireless base station 20 may include one or more processor circuits as the subject that performs the processing.

Firstly, the wireless base station 20 acquires a BSR index from the first field of a BSR received from the wireless terminal 10 (S201). In S201, in a case where the BSR received from the wireless terminal 10 includes a plurality of first fields, the wireless base station 20 may acquire the BSR index from the first field correlated with the LCG as the processing target among the first fields in the BSR.

The wireless base station 20 converts the BSR index (may also be referred to as a first BSR index) acquired in S201 into a buffer value BS1 in accordance with the BSR index table (S202). For example, in a case where the BSR index is "62", according to the BSR index table illustrated in FIG. 2, the buffer value BS1 corresponding to the BSR index is in a range of "2439678 bytes<BS1<=3000000 bytes".

The wireless base station 20 determines whether the BSR index acquired in the process of S201 corresponds to the first index value (S203). Here, the first index value is similar to the first index value in the wireless terminal 10. That is, the first index value according to Example 1 corresponds to the last BSR index in the BSR index table, for example. In the example in FIG. 2, the last BSR index corresponds to the BSR index of "63" meaning that the buffer value BS1 exceeds the maximum value (3000000 bytes) of the buffer, which is defined in the BSR index table. In a case where the BSR index is expressed by a binary number of six digits, the first index value of "63" is expressed by a bit string in which all six digits are "1".

In S203, in a case where the BSR index acquired in S201 is equal to the first index value, the wireless base station 20 may determine that the BSR index corresponds to the first index value (YES in S203). In S203, in a case where the BSR index acquired in S201 is not equal to the first index value, the wireless base station 20 may determine that the BSR index does not correspond to the first index value (NO in S203).

In a case where the wireless base station determines that the BSR index corresponds to the first index value (YES in S203), the wireless base station 20 acquires an additional BSR index (may also be referred to as a second BSR index) from the second field of the BSR received from the wireless terminal 10 (S204). In S204, in a case where the BSR received from the wireless terminal 10 includes a plurality of second fields, the wireless base station acquires the additional BSR index from the second field correlated with the LCG as the processing target.

The wireless base station 20 converts the additional BSR index acquired in S204 into a second buffer value BS2 in accordance with the BSR index table (S205). For example, in a case where the additional BSR index is "62", according to the BSR index table illustrated in FIG. 2, the second buffer value BS2 corresponding to the additional BSR index is in a range of "2439678 bytes<BS2<=3000000".

The wireless base station 20 acquires a buffer estimation value BS of the wireless terminal 10 based on the second buffer value BS2 acquired in S205 and the buffer value BS1 acquired in S202 (S206). Here, the buffer value BS1 acquired in S202 corresponds to the maximum value of the buffer, which is defined in the BSR index table because the BSR index corresponds to the first index value. That is, according to the BSR index table illustrated in FIG. 2, because the maximum value of the buffer is "3000000 bytes", the buffer value BS1 in S206 is "3000000 bytes".

In S206, the wireless base station 20 may acquire the buffer estimation value of the wireless terminal 10, for example, by adding the buffer value BS1 (for example, "3000000 bytes") acquired in S202 to the second buffer value BS2 acquired in S205. For example, in a case where the second buffer value BS2 is in a range of "2439678 bytes<BS2<=3000000", the wireless base station 20 may acquire a range of "5439678 bytes<BS<=6000000" as the buffer estimation value BS, by adding the buffer value BS1 of "3000000 bytes" to each of the upper limit value and the lower limit value defining the range of the second buffer value BS2.

In a case where it is determined, in S203, that the BSR index does not correspond to the first index value (NO in S203), the wireless base station 20 may skip the processes of S204 to S206 and set the buffer value BS1 acquired in S202 to be the buffer estimation value BS of the wireless terminal 10.

The above descriptions are an example of the flow of the processing of the wireless base station 20 in the BSR transmission sequence according to Example 1.

According to an aspect of Example 1 disclosed above, the new second field is added to the buffer status report (BSR) for a notification of the size (also referred to as the buffer value) of uplink data which has been stored in the buffer of the wireless terminal 10 and is not transmitted yet, in accordance with the buffer value of the wireless terminal 10 in addition to the first field for storing the BSR index value. Thus, the wireless terminal 10 may notify the wireless base station 20 of the buffer value of the wireless terminal 10 with high accuracy, by using the first field and the second field of the buffer status report (BSR). Such an action is useful for maintaining and improving performance of the super high speed and large capacity transmission service of an uplink in the fifth-generation mobile communication system.

According to another aspect of Example 1 disclosed above, in a case where the BSR index stored in the first field of the buffer status report (BSR) corresponds to the first index value, the second field for storing the additional BSR index indicating the extent to which the degree of the buffer value of the wireless terminal 10 exceeds the maximum buffer value in the BSR index table, is added to the BSR. Thus, the wireless base station 20 may estimate the buffer value of the wireless terminal 10 with high accuracy, by using the values stored in the first field and the second field of the BSR. Such an action is useful for maintaining and improving performance of the super high speed and large capacity transmission service of an uplink in the fifth-generation mobile communication system.

According to still another aspect of Example 1 disclosed above, the additional BSR stored in the second field of the buffer status report (BSR) corresponds to a buffer value (may also be referred to as the excess buffer value) exceeding the maximum buffer value in the BSR index table, in the buffer value of the wireless terminal 10. Thus, the wireless base station 20 may estimate the buffer value of the wireless terminal 10 with high accuracy, by using the values stored in the first field and the second field of the BSR. Such an action is useful for maintaining and improving performance of the super high speed and large capacity transmission service of an uplink in the fifth-generation mobile communication system.

Example 2

In a wireless communication system 1 according to Example 2, in a case where the BSR index stored in the first field included in buffer status information corresponds to the first index value, an additional BSR index (may also be referred to as an additional index value) associated with a predetermined coefficient (may also be referred to as a BSR coefficient) is stored in the second field which has been newly added. In this case, the buffer value of the wireless terminal 10 is indicated by a result obtained by multiplying the buffer value corresponding to the BSR index of the first field and the BSR coefficient corresponding to the additional BSR index of the second field. Thus, since the buffer value of the wireless terminal 10 is indicated using the first field and the second field of the BSR, the wireless base station 20 may estimate the buffer value of the wireless terminal 10 with high accuracy.

FIG. 6 is a diagram illustrating an example of a BSR index table according to Example 2. In the BSR index table according to Example 2, a predetermined coefficient (may also be referred to as a BSR coefficient) is associated with some of one or more BSR indices defined in the BSR index table. In the BSR index table illustrated in FIG. 6, "×1.5" (meaning a magnification of 1.5), "×2.0" (meaning a magnification of 2.0), "×2.5" (meaning a magnification of 2.5), and "×3.0" (meaning a magnification of 3.0), as the BSR coefficients, are associated with the four BSR indices of "252" to "255" among 256 BSR indices of "0" to "255", respectively.

In the BSR index table illustrated in FIG. 6, buffer values are associated with 252 BSR indices of "0" to "251", respectively. That is, subranges obtained by dividing a range of "0 bytes" to "96000000 bytes" into 251 ranges are correlated with the 251 BSR indices of "0" to "250", respectively. A status where a buffer value exceeds "96000000 bytes" being the maximum value of the buffer, which is defined in the BSR index table is correlated with the last BSR index of "251" among the 252 BSR indices of "0" to "251".

In the example in FIG. 6, the number of BSR indices is extended to 256 in comparison to the example of the BSR index table according to Example 1, which is illustrated in FIG. 2. In other words, the bit length of the BSR index is extended to 8 bits (bit string of 8 digits). In the example in FIG. 6, the maximum value of the buffer, which is defined in the BSR index table is extended to 96000000 bytes. However, it is desirably noted that Example 2 is not limited to such specific values.

It is assumed that a wireless terminal 10 and a wireless base station 20 in the wireless communication system 1 according to Example 2 have a BSR index table as illustrated in FIG. 6.

Figure 7:
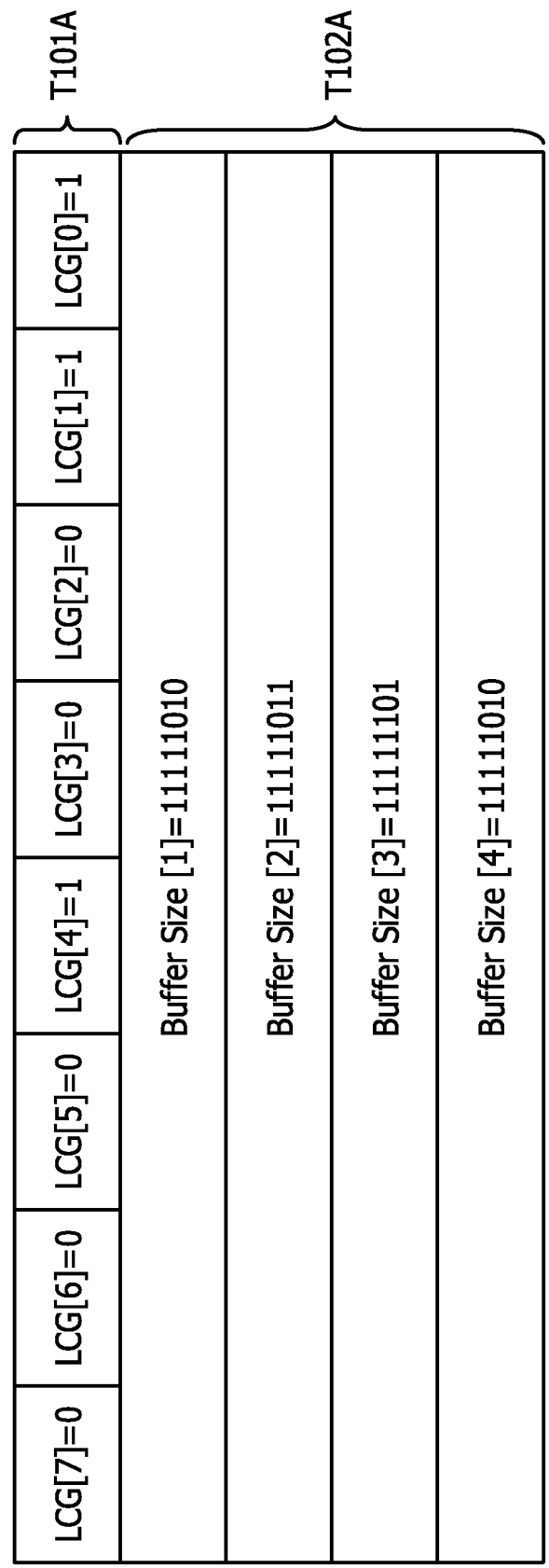
FIG. 7 is a diagram illustrating an example of a buffer status report according to Example 2.

FIG. 7 is a diagram illustrating an example of a buffer status report according to Example 2. Similar to the example in FIG. 3, the buffer status report (BSR) illustrated in FIG. 7 stores a BSR index indicating a buffer value, for each of one or more logical channel groups (LCGs). Also in the example in FIG. 7, the buffer status report (BSR) has a header portion T101A and a body portion T102A. The header portion may indicate whether or not the first field for storing a BSR index is provided for each of one or more LCGs. The body portion T102A may include the first field corresponding to any of one or more LCGs.

In the header portion T101A illustrated in FIG. 7, for 8 LCGs from LCG [0] to LCG [7], a value is set, where the value indicates that the first field is provided in the body portion T102A (that is, "1") or the value indicates that the first field is not provided in the body portion T102A (that is, "0"). In the example in FIG. 7, it is represented that the first field is provided in the body portion T102A for LCG [4], LCG [1], and LCG [0].

The body portion T102A illustrated in FIG. 7 includes four fields from BufferSize [1] to BufferSize [4], as fields for storing information indicating buffer values for the LCGs, regarding LCG [4], LCG [1], and LCG [0] in which the presence of the first field is indicated by the header portion T101A. That is, in the example in FIG. 7, three first fields and one second field are stored in the body portion T102A of a BSR, for the three LCGs (LCG [4], LCG [1], and LCG [0]). The number of fields (first field and second field) provided in the buffer status report (BSR) according to the example is not limited thereto, and may vary.

For example, first fields may be assigned to one or more LCGs in which the presence of the first field is indicated by the header portion T101A, in ascending order of the LCG numbers. BufferSize [1] may be used for the first LCG [0], as the first field for storing a BSR index corresponding to the buffer value for LCG [0]. In the example in FIG. 7, the value of "11111010" is stored in BufferSize [1] as the first field for LCG [0]. The value of "11111010" is a value expressed by a binary number, and is "250" if the value of "11111010" is converted into a decimal number. According to the BSR index table illustrated in FIG. 6, the BSR index of "250" means that the buffer value BS of the wireless terminal 10 exceeds 90089323 bytes and is equal to or smaller than 96000000 bytes.

BufferSize [2] may be used as the first field for storing a BSR index corresponding to the buffer value for the second LCG [1]. In the example in FIG. 7, the value of "11111011" is stored in BufferSize [2] as the first field for LCG [1]. The value of "11111011" is a value expressed by a binary number, and is "251" if the value of "111110111" is converted into a decimal number. According to the BSR index table illustrated in FIG. 6, the BSR index of "251" means that the buffer value exceeds the maximum value (96000000 bytes) of the buffer, which is defined in the BSR index table.

Therefore, in a case where the BSR index corresponds to a value (for example, "251" and "11111011" if being expressed by a binary number) (may also be referred to as a first index value) indicating that the buffer value exceeds the maximum value of the buffer value, a second field for storing an additional index (may also be referred to as a second BSR index) is assigned. In the example in FIG. 7, since the BSR index stored in the first field (BufferSize [2]) for LCG [1] corresponds to the first index value, BufferSize [3] is assigned to LCG [1], as the second field for storing an additional index.

The value of "11111101" is stored in BufferSize [3] as the second field of LCG [1]. The value of "11111101" is a value expressed by a binary number, and is "253" if the value of "11111101" is converted into a decimal number. According to the BSR index table illustrated in FIG. 6, the BSR index of "253" is correlated with the BSR coefficient of "×2.0" (meaning a magnification of 2.0).

According to the example of the buffer status report (BSR) in FIG. 7, BufferSize [2] as the first field and BufferSize [3] as the second field are assigned to LCG [1]. With the first field and the second field, it is possible to send a buffer value exceeding the maximum value (96000000 bytes) of the buffer, which is defined in the BSR index table, to the wireless base station 20. In the example in FIG. 7, the BSR index (may also be referred to as the first BSR index) stored in the first field indicates that the buffer value BS of the wireless terminal 10 exceeds 96000000 bytes. The additional BSR index (may also be referred to as the second BSR index) stored in the second field may indicate the degree of the buffer value of the wireless terminal 10 exceeding 96000000 bytes. For example, it is represented that the buffer value BS for LCG [1] is in a range of 96000000 bytes<BS<=192000000 bytes, based on a result obtained by multiplying the buffer value (96000000 bytes) corresponding to the BSR index in the first field, by the BSR coefficient (2.0) corresponding to the additional BSR index in the second field.

Alternatively, the lower limit value of the buffer value BS of the wireless terminal 10 may be indicated based on the BSR coefficient correlated with a BSR index which is smaller than the additional BSR index stored in the second field by one, among the BSR indices correlated in the BSR coefficients in the BSR index table. For example, in the example in FIG. 7, the additional BSR index stored in the second field is "253" ("11111101" when being expressed by a binary number). According to the BSR index table illustrated in FIG. 6, a BSR index which is smaller than the additional BSR index of "253" by one is "252", and a BSR coefficient corresponding to the BSR index of "252" is "×1.5". According to this example, it is understood that the lower limit value of the buffer value BS of the wireless terminal 10 is "144000000 bytes", based on a result obtained by multiplying a buffer value of "96000000 bytes" corresponding to the BSR index of "251" in the first field by the BSR coefficient of "×1.5". Thus, it is understood that the buffer value BS of the wireless terminal 10 is in a range of 144000000 bytes<BS<=192000000 bytes.

BufferSize [4] may be used as the first field for the last third LCG [4]. In the example in FIG. 7, the value [11111010] is stored in BufferSize [4] as the first field for LCG [4]. The value of "11111010" is a value expressed by a binary number, and is "250" if the value of "11111010" is converted into a decimal number. According to the BSR index table illustrated in FIG. 6, the BSR index of "250" means that the buffer value BS of the wireless terminal 10 exceeds 90089323 bytes and is equal to or smaller than 96000000 bytes.

Next, an example of a flow of processing of the wireless terminal 10 in a BSR transmission sequence according to Example 2 will be described.

Figure 8:
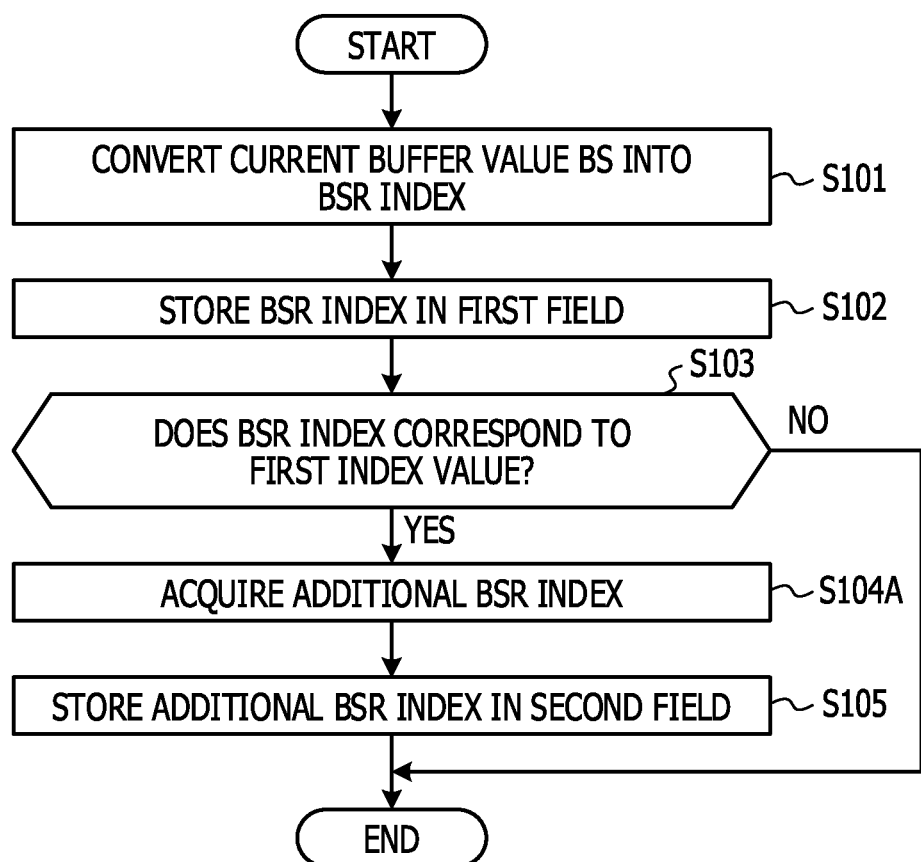
FIG. 8 is a diagram illustrating an example of a flow of processing of a wireless terminal 10 in a BSR transmission sequence according to Example 2.

FIG. 8 is a diagram illustrating an example of the flow of the processing of the wireless terminal 10 in the BSR transmission sequence according to Example 2. The flow of the processing illustrated in FIG. 8 may be performed, for example, when the wireless terminal 10 acquires a BSR index in an LCG unit. In other words, in a case where it is assumed that the wireless terminal acquires BSR indices for a plurality of LCGs, the wireless terminal 10 may perform the processing illustrated in FIG. 8, for each LCG. For easy descriptions, descriptions will be made on the assumption that the wireless terminal 10 performs the processing illustrated in FIG. 8. The wireless terminal 10 may include one or more processor circuits as the subject that performs the processing.

Firstly, the wireless terminal 10 converts the current buffer value BS into a BSR index (S101). In S101, the wireless terminal 10 may acquire the size (may also be referred to as a buffer value, a buffer size value, or a BS value) of uplink data which is stored in the transmission buffer of a logical channel (LC) belonging to an LCG as a processing target and is not transmitted yet. Then, the wireless terminal may convert the BS value into a BSR index in accordance with a BSR index table. In S101, in a case where a plurality of logical channels belonging to the LCG as the processing target is provided, the wireless terminal 10 may set a value obtained by summing buffer values of the logical channels, as the BS value.

The wireless terminal 10 stores the BSR index (may also be referred to as a first BSR index) acquired in S101, in the first field corresponding to the LCG as the processing target (S102).

The wireless terminal 10 determines whether the BSR index acquired in S101 corresponds to the first index value (S103). The first index value corresponds to, for example, the last BSR index among one or more BSR indices correlated with the buffer values in the BSR index table. In the example in FIG. 6, the last BSR index corresponds to a BSR index of "251" meaning that the buffer value BS exceeds the maximum value (96000000 bytes) of the buffer, which is defined in the BSR index table. In other words, in the example in FIG. 6, the first index value may be "251".

In S103, in a case where the BSR index acquired in S101 is equal to the first index, the wireless terminal 10 may determine that the BSR index corresponds to the first index value (YES in S103). In S103, in a case where the BSR index acquired in S101 is not equal to the first index value, the wireless terminal 10 may determine that the BSR index does not correspond to the first index value (NO in S103).

In a case where the wireless terminal determines that the BSR index corresponds to the first index value (YES in S103), the wireless terminal 10 acquires an additional BSR index (may also be referred to as a second BSR index) (S104A). In S104A, the wireless terminal 10 may multiply the buffer value of "96000000 bytes" (may also be referred to as the maximum buffer value) corresponding to the BSR index of "251" in the first field, by BSR coefficients which are respectively correlated with four BSR indices of the BSR index of "251" to the BSR index of "255", in ascending order. In S104A, the wireless terminal 10 selects a BSR index corresponding to the BSR coefficient which causes a multiplication result of the maximum buffer value and the BSR coefficient to be equal to or greater than the buffer value BS of the wireless terminal 10 for the first time, as the additional BSR index. For example, in a case where the buffer value BS of the wireless terminal 10 is "192000000 bytes", Multiplication result [1] of the first BSR coefficient of "×1.5" in ascending order and the maximum buffer value of "96000000 bytes" is "144000000 bytes", and this does not satisfy a condition of the buffer value BS<=Multiplication result [1]. Next, Multiplication result [2] of the second BSR coefficient of "×2.0" in ascending order and the maximum buffer value of "96000000 bytes" is "192000000 bytes", and this satisfies the condition of the buffer value BS<=Multiplication result [2]. Therefore, the wireless terminal 10 may select the BSR index of "253" corresponding to the second BSR coefficient of "×2.0", as the additional BSR index. In this case, multiplication using a BSR coefficient subsequent to the third BSR coefficient may be omitted.

In a case where the wireless terminal has performed the process of S104A, the wireless terminal 10 stores the additional BSR index in the second field corresponding to the LCG as the processing target (S105).

In a case where it is determined, in S103, that the BSR index (may also be referred to as the first BSR index) does not correspond to the first index value (NO in S103), the wireless terminal 10 may skip the processes of S104 and S105 without assigning the second field for the LCG as the processing target.

The above descriptions are an example of the flow of the processing of the wireless terminal 10 in the BSR transmission sequence according to Example 2. Next, a flow of processing of the wireless base station 20 will be described.

Figure 9:
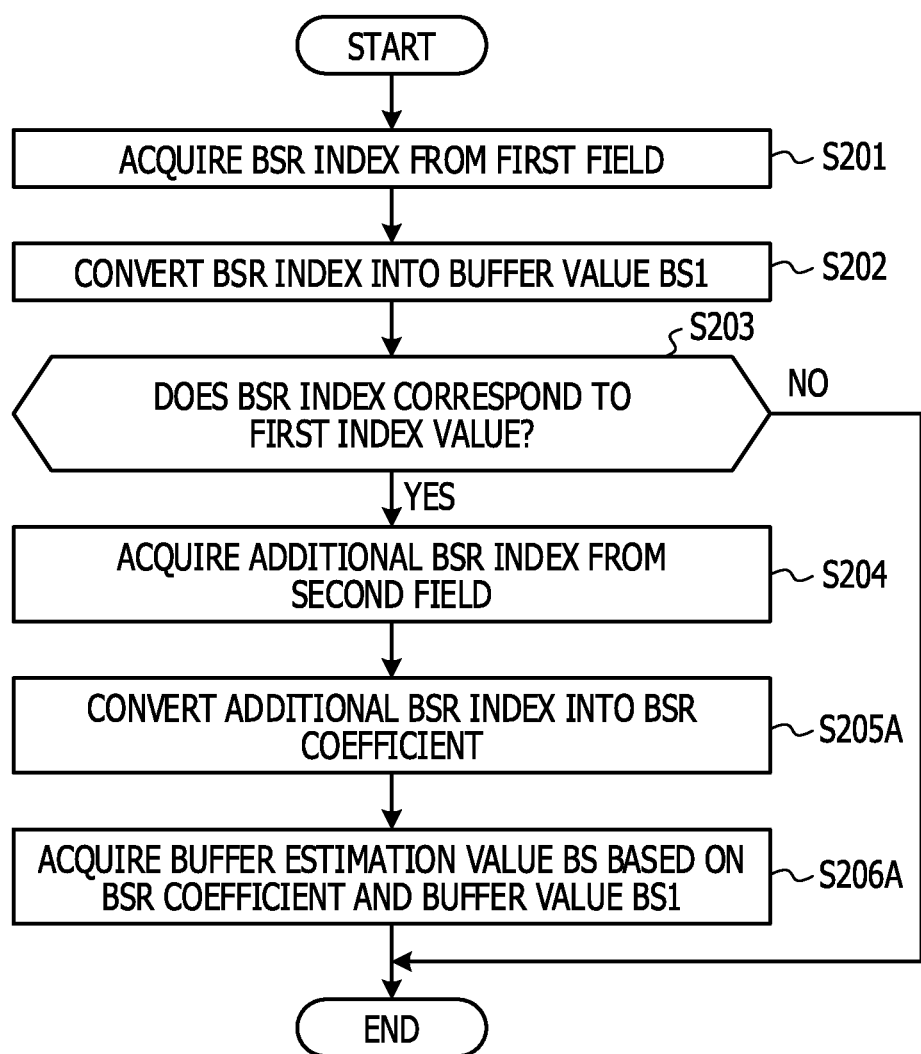
FIG. 9 is a diagram illustrating a flow of processing of a wireless base station 20 in the BSR transmission sequence according to Example 2.

FIG. 9 is a diagram illustrating a flow of the processing of the wireless base station 20 in the BSR transmission sequence according to Example 2. The flow of the processing illustrated in FIG. 9 may be performed, for example, when the wireless base station 20 refers to the first field in an LCG unit from a BSR received from the wireless terminal 10. In other words, in a case where the BSR received from the wireless terminal 10 includes one or more fields for each of a plurality of LCGs, the wireless terminal 10 may perform the processing illustrated in FIG. 9 for each LCG. For easy descriptions, descriptions will be made on the assumption that the wireless base station 20 performs the processing illustrated in FIG. 9. The wireless base station 20 may include one or more processor circuits as the subject that performs the processing.

Firstly, the wireless base station 20 acquires a BSR index from the first field of a BSR received from the wireless terminal 10 (S201). In S201, in a case where the BSR received from the wireless terminal 10 includes a plurality of first fields, the wireless base station 20 may acquire the BSR index from the first field correlated with the LCG as the processing target among the first fields in the BSR.

The wireless base station 20 converts the BSR index (may also be referred to as a first BSR index) acquired in S201 into a buffer value BS1 (may also be referred to as a first buffer value) in accordance with the BSR index table (S202). For example, in a case where the BSR index is "250", according to the BSR index table illustrated in FIG. 6, the buffer value BS1 corresponding to the BSR index is in a range of "90089323 bytes<BS1<=96000000 bytes".

The wireless base station 20 determines whether the BSR index acquired in the process of S201 corresponds to the first index value (S203). Here, the first index value is similar to the first index value in the wireless terminal 10. That is, the first index value corresponds to, for example, the last BSR index among one or more BSR indices correlated with the buffer values in the BSR index table. In the example in FIG. 6, the last BSR index corresponds to the BSR index of "251" meaning that the buffer value BS1 exceeds the maximum value (96000000 bytes) of the buffer, which is defined in the BSR index table. In other words, in the example in FIG. 6, the first index value may be "251".

In S203, in a case where the BSR index acquired in S201 is equal to the first index value, the wireless base station 20 may determine that the BSR index corresponds to the first index value (YES in S203). In S203, in a case where the BSR index acquired in S201 is not equal to the first index value, the wireless base station 20 may determine that the BSR index does not correspond to the first index value (NO in S203).

In a case where the wireless base station determines that the BSR index corresponds to the first index value (YES in S203), the wireless base station 20 acquires an additional BSR index (may also be referred to as a second BSR index) from the second field of the BSR received from the wireless terminal 10 (S204). In S204, in a case where the BSR received from the wireless terminal 10 includes a plurality of second fields, the wireless base station acquires the additional BSR index from the second field correlated with the LCG as the processing target.

The wireless base station 20 converts the additional BSR index acquired in S204 into a BSR coefficient in accordance with the BSR index table (S205A). For example, in a case where the additional BSR index is "253", according to the BSR index table illustrated in FIG. 6, the BSR coefficient corresponding to the additional BSR index is "×2.0".

The wireless base station 20 acquires a buffer estimation value of the wireless terminal 10 based on the BSR coefficient acquired in S205A and the buffer value BS1 acquired in S202 (S206A). Here, since the BSR index corresponds to the first index value, the buffer value BS acquired in S202 corresponds to the maximum value of the buffer, which is defined in the BSR index table. That is, according to the BSR index table illustrated in FIG. 6, because the maximum value of the buffer is "96000000 bytes", the buffer value BS1 in S206A is "96000000 bytes".

In S206A, the wireless base station 20 may acquire the buffer estimation value BS of the wireless terminal 10 by multiplying the buffer value BS1 (for example, "96000000 bytes") acquired in S202 by the BSR coefficient acquired in S205A, for example. For example, the wireless terminal 10 may acquire "192000000 bytes" being an upper limit of the buffer estimation value BS, by multiplying the buffer value BS1 of "96000000 bytes" acquired in S202 by the BSR coefficient of "×2.0" acquired in S205. In this case, a lower limit of the buffer estimation value BS may be set to "96000000 bytes" being the buffer value BS1 acquired in S202. That is, the wireless base station 20 may acquire a range of "96000000 bytes<BS<=192000000 bytes" as the buffer estimation value BS, based on the BSR coefficient and the buffer value BS1.

In S206A, the wireless base station 20 may acquire the lower limit of the buffer estimation value BS of the wireless terminal 10 based on the BSR coefficient correlated with a BSR index which is smaller than the additional BSR index acquired from the second field of the BSR in S204, by one, among the BSR indices correlated in the BSR coefficients in the BSR index table. For example, in the example in FIG. 7, the additional BSR index acquired from the second field of the BSR is "253" ("11111101" when being expressed by a binary number). According to the BSR index table illustrated in FIG. 6, a BSR index which is smaller than the additional BSR index of "253" by one is "252", and a BSR coefficient corresponding to the BSR index of "252" is "×1.5". In this example, the wireless base station 20 acquires "144000000 bytes" as the lower limit value of the buffer estimation value BS, based on a result obtained by multiplying "96000000 bytes" being the buffer value BS1 acquired in S202, by the BSR coefficient of "×1.5". That is, the wireless base station 20 may acquire a range of "144000000 bytes<BS<=192000000 bytes" as the buffer estimation value BS, based on the BSR coefficient and the buffer value BS1.

In a case where it is determined, in S203, that the BSR index does not correspond to the first index value (NO in S203), the wireless base station 20 may skip the processes of S204 to S206A and set the buffer value BS1 acquired in S202 to be the buffer estimation value BS of the wireless terminal 10.

The above descriptions are an example of the flow of the processing of the wireless base station 20 in the BSR transmission sequence according to Example 2.

According to an aspect of Example 2 disclosed above, the new second field is added to the buffer status report (BSR) for a notification of the size (also referred to as the buffer value) of uplink data which has been stored in the buffer of the wireless terminal 10 and is not transmitted yet, in accordance with the buffer value of the wireless terminal in addition to the first field for storing the BSR index value. Thus, the wireless terminal 10 may notify the wireless base station 20 of the buffer value of the wireless terminal 10 with high accuracy, by using the first field and the second field of the buffer status report (BSR). Such an action is useful for maintaining and improving performance of the super high speed and large capacity transmission service of an uplink in the fifth-generation mobile communication system.

According to another aspect of Example 2 disclosed above, in a case where the BSR index stored in the first field of the buffer status report (BSR) corresponds to the first index value, the second field for storing the additional BSR index indicating the degree of the buffer value of the wireless terminal 10 exceeding the maximum buffer value in the BSR index table, is added to the BSR. Thus, the wireless base station 20 may estimate the buffer value of the wireless terminal 10 with high accuracy, by using the values stored in the first field and the second field of the BSR. Such an action is useful for maintaining and improving performance of the super high speed and large capacity transmission service of an uplink in the fifth-generation mobile communication system.

According to still another aspect of Example 2 disclosed above, the additional BSR stored in the second field of the buffer status report (BSR) corresponds to a BSR coefficient indicating the degree of the buffer value of the wireless terminal 10 exceeding the maximum buffer value in the BSR index table. Thus, the wireless base station 20 may estimate the buffer value of the wireless terminal 10 with high accuracy, by using the values stored in the first field and the second field of the BSR. Such an action is useful for maintaining and improving performance of the super high speed and large capacity transmission service of an uplink in the fifth-generation mobile communication system.

Example 3

In a wireless communication system 1 according to Example 3, the maximum buffer value may be set for each logical channel group (LCG) of an uplink. Thus, it is possible to transmit a buffer status report using a BSR index table (may also be referred to as a conversion table) for defining the proper maximum buffer value, in accordance with characteristics of a wireless service of each LCG. Therefore, it is possible to notify a wireless base station 20 of the buffer value of a wireless terminal 10 with high accuracy.

FIG. 10 is a diagram illustrating an example of a BSR index table according to Example 3. In the BSR index table illustrated in FIG. 10, a range from 0 bytes to 192000000 bytes (=192 Mbytes=192000 Kbytes) is divided into ranges of 63 steps, and 63 BSR indices (that is, 0 to 62) are respectively associated with the ranges. For example, a range of "145848796<BS<=192000000" is associated with a BSR index having an index value of "62". A buffer value BS belonging to the range of "145848796<BS<=192000000" is any value in a range of being greater than 145848796 bytes and equal to or smaller than 192000000 bytes. The last BSR index (that is, 63) means a buffer value BS exceeding the maximum value (may also be referred to as a maximum buffer value) of a buffer, which is defined in the BSR index table. In the example in FIG. 10, the maximum buffer value defined in the BSR index table is "192000000 bytes". The values in the BSR index table illustrated in FIG. 10 are just examples, and Example 3 is not limited to the values.

It is assumed that a wireless terminal 10 and a wireless base station 20 in the wireless communication system 1 according to Example 3 have the BSR index table (may also be referred to as a first BSR index table or a first conversion table) illustrated in FIG. 2 and the BSR index table (may also be referred to as a second BSR index table, a second conversion table, an extended BSR index table, or an extended conversion table) illustrated in FIG. 10. The maximum buffer value in the first conversion table in the example in FIG. 2 is "3000000 bytes", and the maximum buffer value in the second conversion table in the example in FIG. 10 is "192000000 bytes". That is, the maximum buffer value in the first conversion table is different from the maximum buffer value in the second conversion table.

Figure 11:
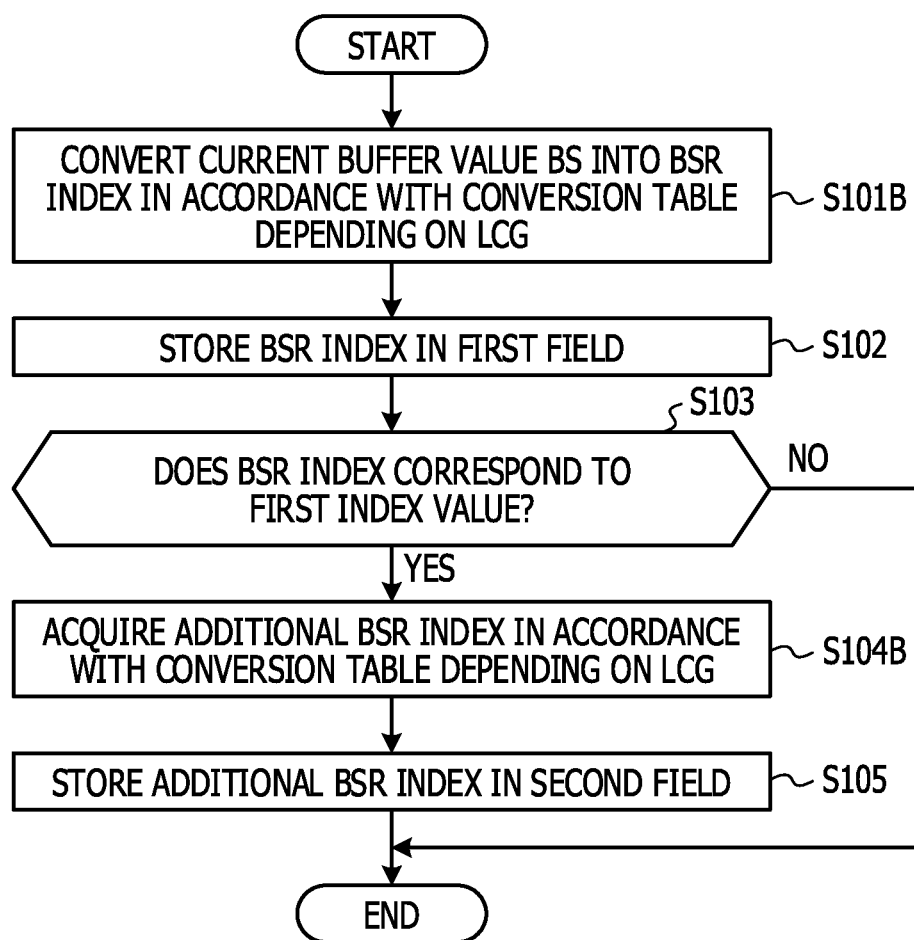
FIG. 11 is a diagram illustrating an example of a flow of processing of a wireless terminal 10 in a BSR transmission sequence according to Example 3.

FIG. 11 is a diagram illustrating an example of a flow of processing of the wireless terminal 10 in a BSR transmission sequence according to Example 3. The flow of the processing illustrated in FIG. 11 may be performed, for example, when the wireless terminal 10 acquires a BSR index in an LCG unit. In other words, in a case where it is assumed that the wireless terminal acquires BSR indices for a plurality of LCGs, the wireless terminal 10 may perform the processing illustrated in FIG. 11, for each LCG. For easy descriptions, descriptions will be made on the assumption that the wireless terminal 10 performs the processing illustrated in FIG. 11. The wireless terminal 10 may include one or more processor circuits as the subject that performs the processing.

Firstly, the wireless terminal 10 converts the current buffer value BS into a BSR index in accordance with the conversion table depending on an LCG as a processing target (S101B). In S101B, the wireless terminal 10 may select a conversion table depending on the LCG as the processing target, based on settings from a higher layer.

FIG. 12 is a diagram illustrating an example of setting information regarding a correspondence relation between the conversion table according to Example 3 and LCGs. In the example in FIG. 12 the maximum buffer value (BS Max value) is set for each logical channel group (LCG). For example, the maximum buffer value of "3000000 bytes" (may also be referred to as a first value) is set for LCG [0], LCG [2], LCG [3], LCG [4], and LCG [5]. The maximum buffer value of "192000000 bytes" (may also be referred to as a second value) which is greater than the first value is set for LCG [1]. The example in FIG. 12 represents the concept of the setting information, and the above-described values does not have to be set. For example, the first value and the second value may be distinguished from each other by setting numerical values of one bit (that is, "1" and "0"), respectively. In other words, whether the maximum buffer value correlated with an LCG is the first value or the second value may be set by associating "1" or "0" with each LCG in setting information.

It is assumed that the wireless terminal 10 and the wireless base station 20 in the wireless communication system 1 according to Example 3 have setting information illustrated in FIG. 12. The wireless terminal 10 may acquire the setting information illustrated in FIG. 12, by a radio resource control (RRC) message transmitted from the wireless base station 20. In other words, the wireless base station 20 may transmit an RRC message including the setting information illustrated in FIG. 12 to the wireless terminal 10. Such an RRC message may include setting information in which the maximum buffer value for each of a plurality of LCGs is defined, or may include setting information in which the maximum buffer value for one LCG is defined.

In S101B, the wireless terminal 10 may acquire the maximum buffer value corresponding to an LCG as the processing target, based on the setting information illustrated in FIG. 12. The wireless terminal may select a conversion table depending on the LCG as the processing target by selecting a conversion table in which the maximum buffer value is defined among a plurality of conversion tables. For example, in a case where an LCG as the processing target is LCG [0], the maximum buffer value corresponding to LCG [0] is "3000000 bytes" according to the example in FIG. 12. Thus, the wireless terminal 10 selects a first conversion table. In a case where the LCG as the processing target is LCG [1], the maximum buffer value corresponding to LCG [1] is "192000000 bytes" according to the example in FIG. 12. Thus, the wireless terminal 10 selects a second conversion table.

In S101B, the wireless terminal 10 may acquire the size (may also be referred to as a buffer value, a buffer size value, or a BS value) of uplink data which is stored in the transmission buffer of a logical channel (LC) belonging to an LCG as a processing target and is not transmitted yet. Then, the wireless terminal 10 may convert the BS value into a BSR index in accordance with the conversion table (may also be referred to as the BSR index table) depending on the LCG as the processing target. In S101B, in a case where a plurality of logical channels belonging to the LCG as the processing target is provided, the wireless terminal 10 may set a value obtained by summing buffer values of the logical channels, as the BS value.

The wireless terminal 10 stores the BSR index (may also be referred to as a first BSR index) acquired in S101B, in the first field corresponding to the LCG as the processing target (S102).

The wireless terminal 10 determines whether the BSR index acquired in S101B corresponds to the first index value (S103). The first index value according to Example 3 corresponds to, for example, the last BSR index among one or more BSR indices correlated with the buffer values in the conversion table (may also be referred to as the BSR index table) depending on the LCG as the processing target. In the example in FIG. 2, the last BSR index in the first conversion table is "63". In the example in FIG. 10, the last BSR index in the second conversion table is "63". The last BSR index in the example in FIG. 2 and the last BSR index in the example in FIG. 10 are "63", that is, equal to each other. However, it is desirably noted that the maximum buffer value (192000000 bytes) in the second conversion table is greater than the maximum buffer value (3000000 bytes) in the first conversion table.

In S103, in a case where the BSR index acquired in S101B is equal to the first index value, the wireless terminal 10 may determine that the BSR index corresponds to the first index value (YES in S103). In S103, in a case where the BSR index acquired in S101 is not equal to the first index value, the wireless terminal 10 may determine that the BSR index does not correspond to the first index value (NO in S103).

In a case where the wireless terminal determines that the BSR index corresponds to the first index value (YES in S103), the wireless terminal 10 acquires an additional BSR index (may also be referred to as a second BSR index) in accordance with the conversion table depending on the LCG as the processing target (S104B). In S104B, the wireless terminal 10 may acquire an excess buffer value BS2 corresponding to the amount of the buffer exceeding the maximum buffer value, by subtracting the maximum buffer value defined in the conversion table depending on the LCG as the processing target from the buffer value BS. For example, in a case where the conversion table depending on the LCG as the processing target is the first conversion table, according to the example in FIG. 2, the maximum buffer value is "3000000 bytes". If the buffer value BS is "6000000 bytes", the excess buffer value BS2 is "3000000 bytes" (=6000000 bytes-3000 bytes). According to the example in FIG. 10, if the buffer value BS is "6000000 bytes", it is desirably noted that the excess buffer value BS2 is not provided in the second conversion table.

In S104B, the wireless terminal 10 may acquire an additional BSR index by selecting a BSR index corresponding to the excess buffer value BS2 in accordance with the conversion table depending on the LCG as the processing target. For example, in a case where the excess buffer value BS2 is "3000000 bytes", according to the second conversion table illustrated in FIG. 2, the additional BSR corresponding to the excess buffer value BS2 is "62".

In a case where the wireless terminal has performed the process of S104B, the wireless terminal 10 stores the additional BSR index in the second field corresponding to the LCG as the processing target (S105).

In a case where it is determined, in S103, that the BSR index (may also be referred to as the first BSR index) does not correspond to the first index value (NO in S103), the wireless terminal 10 may skip the processes of S104 and S105 without assigning the second field for the LCG as the processing target.

The above descriptions are an example of the flow of the processing of the wireless terminal 10 in the BSR transmission sequence according to Example 3. Next, a flow of processing of the wireless base station 20 will be described.

Figure 13:
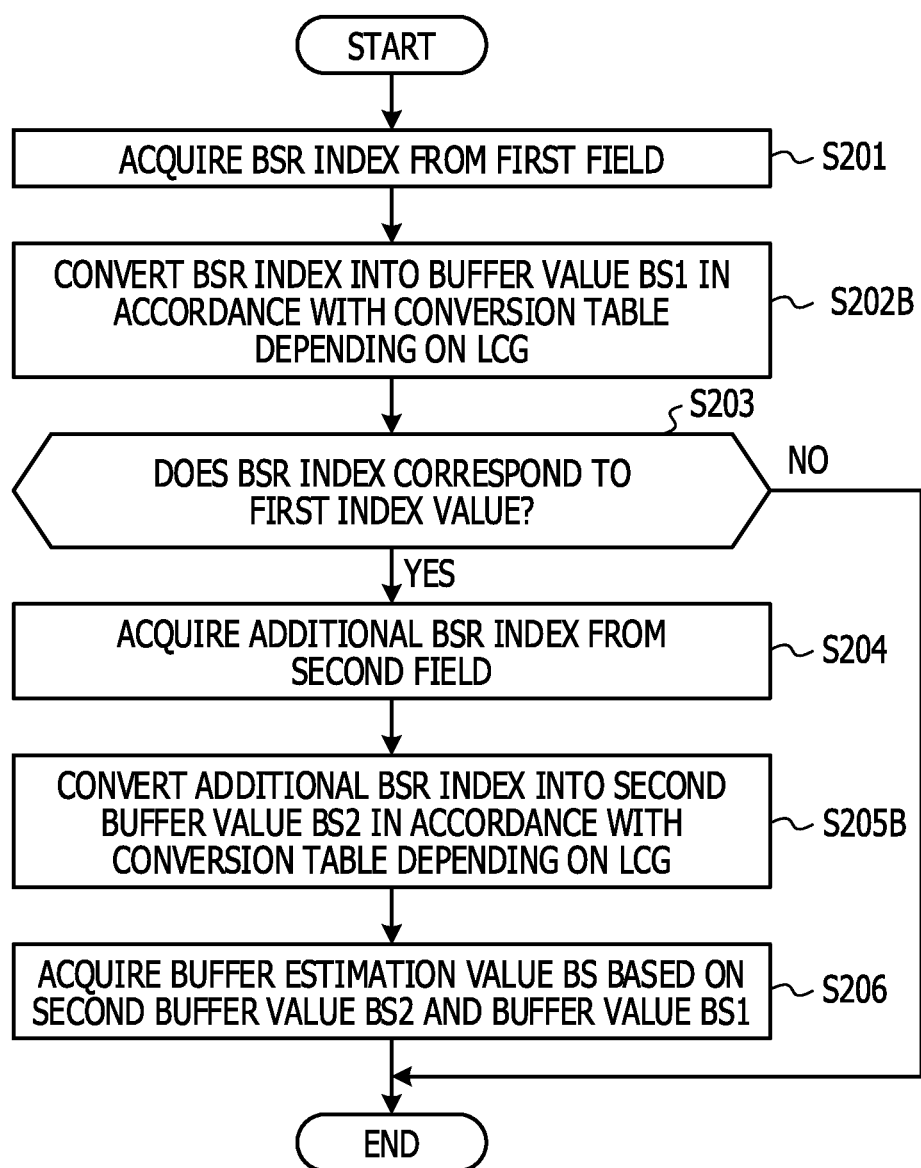
FIG. 13 is a diagram illustrating a flow of processing of a wireless base station 20 in the BSR transmission sequence according to Example 3.

FIG. 13 is a diagram illustrating a flow of processing of the wireless base station 20 in the BSR transmission sequence according to Example 3. The flow of the processing illustrated in FIG. 13 may be performed, for example, when the wireless base station 20 refers to the first field of an LCG unit from a BSR received from the wireless terminal 10. In other words, in a case where the BSR received from the wireless terminal 10 includes one or more fields for each of a plurality of LCGs, the wireless terminal 10 may perform the processing illustrated in FIG. 13 for each LCG. For easy descriptions, descriptions will be made on the assumption that the wireless base station 20 performs the processing illustrated in FIG. 13. The wireless base station 20 may include one or more processor circuits as the subject that performs the processing.

Firstly, the wireless base station 20 acquires a BSR index from the first field of a BSR received from the wireless terminal 10 (S201). In S201, in a case where the BSR received from the wireless terminal 10 includes a plurality of first fields, the wireless base station 20 may acquire the BSR index from the first field correlated with the LCG as the processing target among the first fields in the BSR.

The wireless base station 20 converts the BSR index (may also be referred to as a first BSR index) acquired in S201 into a buffer value BS1 in accordance with the conversion table depending on the LCG as the processing target (S202B). For example, in a case where the BSR index is "62", according to the first conversion table illustrated in FIG. 2, the buffer value BS1 corresponding to the BSR index is in a range of "2439678 bytes<BS1<=3000000 bytes". A method of selecting a conversion table depending on an LCG as the processing target is similar to the process of S101B in the wireless terminal 10. Thus, detailed descriptions thereof will be omitted.

The wireless base station 20 determines whether the BSR index acquired in the process of S201 corresponds to the first index value (S203). Here, the first index value is similar to the first index value in the wireless terminal 10. That is, the first index value according to Example 3 corresponds to, for example, the last BSR index in the conversion table depending on the LCG as the processing target. In the example in FIG. 2, the last BSR index in the first conversion table is "63". In the example in FIG. 10, the last BSR index in the second conversion table is "63". The last BSR index in the example in FIG. 2 and the last BSR index in the example in FIG. 10 are "63", that is, equal to each other. However, it is desirably noted that the maximum buffer value (192000000 bytes) in the second conversion table is greater than the maximum buffer value (3000000 bytes) in the first conversion table.

In S203, in a case where the BSR index acquired in S201 is equal to the first index value, the wireless base station 20 may determine that the BSR index corresponds to the first index value (YES in S203). In S203, in a case where the BSR index acquired in S201 is not equal to the first index value, the wireless base station 20 may determine that the BSR index does not correspond to the first index value (NO in S203).

In a case where the wireless base station determines that the BSR index corresponds to the first index value (YES in S203), the wireless base station 20 acquires an additional BSR index (may also be referred to as a second BSR index) from the second field of the BSR received from the wireless terminal 10 (S204). In S204, in a case where the BSR received from the wireless terminal 10 includes a plurality of second fields, the wireless base station acquires the additional BSR index from the second field correlated with the LCG as the processing target.

The wireless base station 20 converts the additional BSR index acquired in S204 into a second buffer value BS2 in accordance with the conversion table depending on the LCG as the processing target (S205B). For example, in a case where the additional BSR index is "62", according to the first conversion table illustrated in FIG. 2, the second buffer value BS2 corresponding to the additional BSR index is in a range of "2439678 bytes<BS2<=3000000".

The wireless base station 20 acquires a buffer estimation value BS of the wireless terminal 10 based on the second buffer value BS2 acquired in S205B and the buffer value BS1 acquired in S202B (S206). Here, since the BSR index corresponds to the first index value, the buffer value BS1 acquired in S202B corresponds to the maximum buffer value defined in the conversion table depending on the LCG as the processing target. That is, according to the first conversion table illustrated in FIG. 2, because the maximum value of the buffer is "3000000 bytes", the buffer value BS1 in S206 is "3000000 bytes". According to the second conversion table illustrated in FIG. 10, because the maximum value of the buffer is "192000000 bytes", the buffer value BS1 in S206 is "192000000 bytes".

In S206, the wireless base station 20 may acquire the buffer estimation value BS of the wireless terminal 10, for example, by adding the buffer value BS1 (for example, "3000000 bytes") acquired in S202B to the second buffer value BS2 acquired in S205B. For example, in a case where the second buffer value BS2 is in a range of "2439678 bytes<BS2<=3000000", according to the first conversion table illustrated in FIG. 2, the wireless base station 20 may acquire a range of "5439678 bytes<BS<=6000000" as the buffer estimation value BS, by adding the buffer value BS1 of "3000000 bytes" to each of the upper limit value and the lower limit value defining the range of the second buffer value BS2.

In a case where it is determined, in S203, that the BSR index does not correspond to the first index value (NO in S203), the wireless base station 20 may skip the processes of S204 to S206 and set the buffer value BS1 acquired in S202B to be the buffer estimation value BS of the wireless terminal 10.

The above descriptions are an example of the flow of the processing of the wireless base station 20 in the BSR transmission sequence according to Example 3.

According to an aspect of Example 3 disclosed above, the new second field is added to the buffer status report (BSR) for a notification of the size (also referred to as the buffer value) of uplink data which has been stored in the buffer of the wireless terminal 10 and is not transmitted yet, in accordance with the buffer value of the wireless terminal 10 in addition to the first field for storing the BSR index value. Thus, the wireless terminal 10 may notify the wireless base station 20 of the buffer value of the wireless terminal 10 with high accuracy, by using the first field and the second field of the buffer status report (BSR). Such an action is useful for maintaining and improving performance of the super high speed and large capacity transmission service of an uplink in the fifth-generation mobile communication system.

According to another aspect of Example 3 disclosed above, it is possible to set the maximum buffer value in the conversion table (may also be referred to as the BSR index table) for each logical channel group (LCG) of an uplink. For example, if the second conversion table in which the large maximum buffer value is defined among a plurality of conversion tables is set to be assigned to an LCG to which a logical channel used in a super high speed and large capacity transmission service such as eMBB belongs, it is possible to suppress an occurrence of a situation in which the buffer value of the wireless terminal 10 exceeds the maximum buffer value defined in the conversion table. If the first conversion table in which the maximum buffer value smaller than that in the second conversion table is defined is set to be assigned to an LCG to which a logical channel used in a transmission service in which generation of uplink data having a volume increasing with the super high speed and large capacity transmission service such as eMBB is not supposed, it is possible to suppress roughness of the granularity of the buffer values notified by a buffer status report (BSR). Thus, the wireless terminal 10 according to Example 3 may send the buffer value of the wireless terminal 10 to the wireless base station 20 with higher accuracy. In other words, the wireless base station 20 according to Example 3 may estimate the buffer value of the wireless terminal 10 based on the buffer status report (BSR) from the wireless terminal 10, with higher accuracy. Such an action is useful for maintaining and improving performance of the super high speed and large capacity transmission service of an uplink in the fifth-generation mobile communication system.

Example 4

In a wireless communication system 1 according to Example 4, the bit length of a BSR index used in a transmission sequence of a buffer status report (BSR) for a notification of the size (also referred to as the buffer value) of uplink data which has been stored in a buffer of a wireless terminal 10 and is not transmitted yet is extended to n bits (for example, 8 bits). A reserve is specified in some indices (may also be referred to as BSR indices) in the BSR index table. Thus, it is possible to suppress an occurrence of a situation in which the buffer value of the wireless terminal 10 exceeds the maximum buffer value defined in the conversion table and to perform a design in which ranges of the buffer value, which are defined in the BSR index table so as to be specified with a proper granularity.

Firstly, the motive for introduction of Example 4 will be described. As described above, the discussion in the fifth-generation mobile communication system is just started, and thus detailed specifications are not fixed in many cases. Among the specifications, regarding a method of determining a buffer value defined in the BSR index table, an idea has been proposed that inheriting the same method as for that in the fourth-generation mobile communication system (may also be referred to as LTE).

In the fourth-generation mobile communication system, the upper limit value $B_k$ of a buffer correlated with the k-th index defined in the BSR index table is represented by an expression as follows. The lower limit value of the buffer correlated with the k-th index is represented by $B_{min}$ or $B_{k-1}$.

$$B_k = eB_{min} \times (1-p)^k u \quad (1)$$

Here, the value p is defined by the following expression.

$$p = (B_{max}/B_{min})^{1/(N-1)} - 1 \quad (2)$$

In the expressions (1) and (2), the value $B_{min}$ is the minimum value (may also be referred to as the minimum buffer value) of the buffer defined in the BSR index table and is, for example, 10 bytes. In the expressions (1) and (2), the value $B_{max}$ is the maximum value (may also be referred to as the maximum buffer value) of the buffer defined in the BSR index table. The value N in the expression (2) is a value depending on the bit length of the BSR index defined in the BSR index table. For example, in a case of a BSR index having a bit length of 6 bits, the value N is $2^6-1=63$. The method of determining the buffer value defined in the above-described BSR index table is specifically described in NPL "R2-083101, Buffer Size Levels for BSR in E-UTRA Uplink".

FIG. 14 illustrates a content example of a BSR index table in a case where the BSR index is extended to 8 bits. In the example in FIG. 14, the BSR index is extended to 8 bits, and thus 256 BSR indices having values of 0 to 255 are provided. In the BSR index table in FIG. 14, buffer values determined by a method similar to that in the fourth-generation mobile communication system are defined for the 256 BSR indices.

As understood from the example in FIG. 14, if the BSR index is extended and the buffer values are defined by the method similar to that in the fourth-generation mobile communication system, a problem may occur in that overlapping buffer values are defined in some BSR indices. That is, in the example in FIG. 14, a buffer value of "13<BS<=13" is defined for a BSR index of "5". In other words, a buffer value which overlaps a buffer value for a BSR index of "4" is defined for the BSR index of "5". Therefore, the BSR index of "5" comes to an index having no meaning. Alternatively, in another view, since the BS value satisfying "13<BS<=13" does not exist mathematically, the BSR index of "5" is an invalid index. As described above, if the bit length of the BSR index is extended, it is possible to increase the maximum buffer value defined in the BSR index table, but a problem may occur in that the granularity of buffer values becomes too fine. In the example in FIG. 14, the value $B_{min}$ is 10 bytes, and the value $B_{max}$ is 96000000 bytes ("150 Kbytes*10*16*4"="($B_{max}$ in LTE)* (rate of 10 times)*16 carriers*4 UL MIMO layers").

In Example 4, some BSR indices among a plurality of BSR indices defined in the BSR index table are handled as reserves.

FIG. 15 is a diagram illustrating a content example of the BSR index table according to Example 4. In the BSR index table in FIG. 15, 16 BSR indices of "240" to "255" among BSR indices defined in the BSR index table are defined as reserves. In other words, buffer values are defined for 240 BSR indices of "0" to "239" among BSR indices having a bit length of 8 bits. Thus, the value N in the above-described expression (2) is changed. Therefore, in the example in FIG. 15, the problem of the buffer value for the BSR index of "15", which has occurred in the example in FIG. 14 is solved. In the example in FIG. 15, the first index value may be "239".

Modification Example 1

In Examples 1 to 3 described above, an example in which one first field and one second field are assigned for one LCG in a case where the buffer value of the wireless terminal 10 exceeds the maximum buffer value is described. However, the disclosure is not limited to the example. For example, one first field and a plurality of second fields may be assigned for one LCG, in accordance with the degree of the buffer value of the wireless terminal 10 exceeding the maximum buffer value defined in the BSR index table.

For example, in S104, the wireless terminal 10 may determine whether a BSR index (may also be referred to as a first additional BSR index) obtained by converting an excess buffer value BS2 (may also be referred to as a first excess buffer value BS2 [1]) in accordance with the BSR index table corresponds to the first index value. In a case where the first additional BSR index corresponds to the first index value, the wireless terminal may assign a second field (may also be referred to as second field [1]) for storing the first additional BSR index to an LCG as the processing target. The wireless terminal 10 may acquire a second excess buffer value BS2 [2] by subtracting the maximum buffer value from the first excess buffer value BS2 [1]. Then, the wireless terminal may assign second field [2] for storing a BSR index (second additional BSR index) obtained by converting the second excess buffer value BS [2], to an LCG as the processing target. The wireless terminal 10 may repeat processing of adding a second field, in accordance with whether or not the second additional BSR index corresponds to the first index value.

Modification Example 2

In Example 3 described above, a case where a new second field is added to a buffer status report (BSR) for a notification of the size (also referred to as a buffer value) of uplink data which has been stored in the buffer of the wireless terminal 10 and is not transmitted yet, in accordance with the buffer value of the wireless terminal 10 in addition to the first field for storing a BSR index value is described. However, Example 3 is not limited to this case.

For example, the wireless terminal 10 may perform the process (S101B) of converting the current buffer value BS into a BSR index and the process (S102) of storing the BSR index in the first field of a BSR, in accordance with the conversion table depending on an LCG as the processing target, and may omit the subsequent processes (S103 to S105).

The wireless base station 20 may perform the process (S201) of acquiring a BSR index from the first field of the buffer status report (BSR) which has been received from the wireless terminal 10 and perform the process (S202B) of converting the BSR index acquired in S201 into a buffer value BS1 in accordance with the conversion table depending on an LCG as the processing target. The wireless base station may omit the subsequent processes (S203 to S206).

According to an aspect of Modification Example 2, it is possible to set the maximum buffer value in the conversion table (may also be referred to as the BSR index table), for each logical channel group (LCG) of an uplink. For example, by setting the second conversion table in which the large maximum buffer value is defined among a plurality of conversion tables is set to be assigned to an LCG with which a logical channel is associated for a super high speed and large capacity transmission service such as eMBB belongs, it is possible to suppress an occurrence of a situation in which the buffer value of the wireless terminal 10 exceeds the maximum buffer value defined in the conversion table. By setting the first conversion table in which the maximum buffer value smaller than that in the second conversion table is defined to be assigned to an LCG with which a logical channel is associated for a transmission service in which generation of the amount of uplink data is supposed to be not as large as that in the super high speed and large capacity transmission service such as eMBB, it is possible to suppress roughness of the step size between the buffer values of which a notification is performed by a buffer status report (BSR). Thus, the wireless terminal 10 according to Example 3 may send the buffer value of the wireless terminal 10 to the wireless base station 20 with higher accuracy. In other words, the wireless base station 20 according to Example 3 may estimate the buffer value of the wireless terminal 10 based on the buffer status report (BSR) from the wireless terminal 10, with higher accuracy. Such an action is useful for maintaining and improving performance of the super high speed and large capacity transmission service of an uplink in the fifth-generation mobile communication system.

Modification Example 3

In the above-described Example 4, an example of n=8 is described as an example in which the BSR index is extended to n bits. However, Example 4 is not limited thereto. For example, n is any value so long as n is greater than 6 bits in the related art. In other words, in Example 4, some BSR indices among BSR indices of n bits (n is a value greater than 6) are defined as reserves regardless of that a specific buffer value is correlated with the BSR index.

Modification Example 4

In the above-described Example 4, an example in which 16 BSR indices of "240" to "255" are set to be reserved is described as an example in which some BSR indices are set to be reserved. However, Example 4 is not limited to this example. For example, among BSR indices having a bit length which has been extended to n bits (n is greater than 6), i bits may be set as reservation bits, and buffer values may be defined for BSR indices of (n−i) bits. For example, among BSR indices having a bit length extended to 8 bits, the one leading bit may be set as a reservation bit, and buffer values may be defined for BSR indices of the remaining 7 bits. In this case, buffer values may be defined for 128 BSR indices of "0" to "127".

Modification Example 5

In the above-described Example 4, an example in which 16 BSR indices of "240" to "255" are set to be reserved is described as an example in which some BSR indices are set to be reserved. However, Example 4 is not limited to this example. For example, BSR indices of "240" to "255" are defined to be reserved. However, 16 BSR indices of "0" to "15" may be defined to be reserved. In this case, the BSR index of "16" is "0" and the subsequent BSR indices have values similar to those in FIG. 15.

Modification Example 6

In the above-described Example 4, the solution for an example in which the buffer value of "13<BS<=13" is defined for the BSR index of "5" is described. However, Example 4 is not limited thereto. As a measure for solving a problem in that the step size becomes too fine by extending the bit length of the BSR index, for example, the unit of the buffer value defined in the BSR index table may be changed. For example, the unit of the buffer value (BS value: Buffer Size Value) may be defined to be a bit unit instead of byte. In other words, the value of the BS value may be multiplied by 8. With this method, a buffer size value (BSV) for a BSR index of "5" is a mathematically-valid value. Therefore, the wireless terminal may utilize a BSR using a BSV for the BSR index of "5".

<Hardware Configuration>

Figure 16:
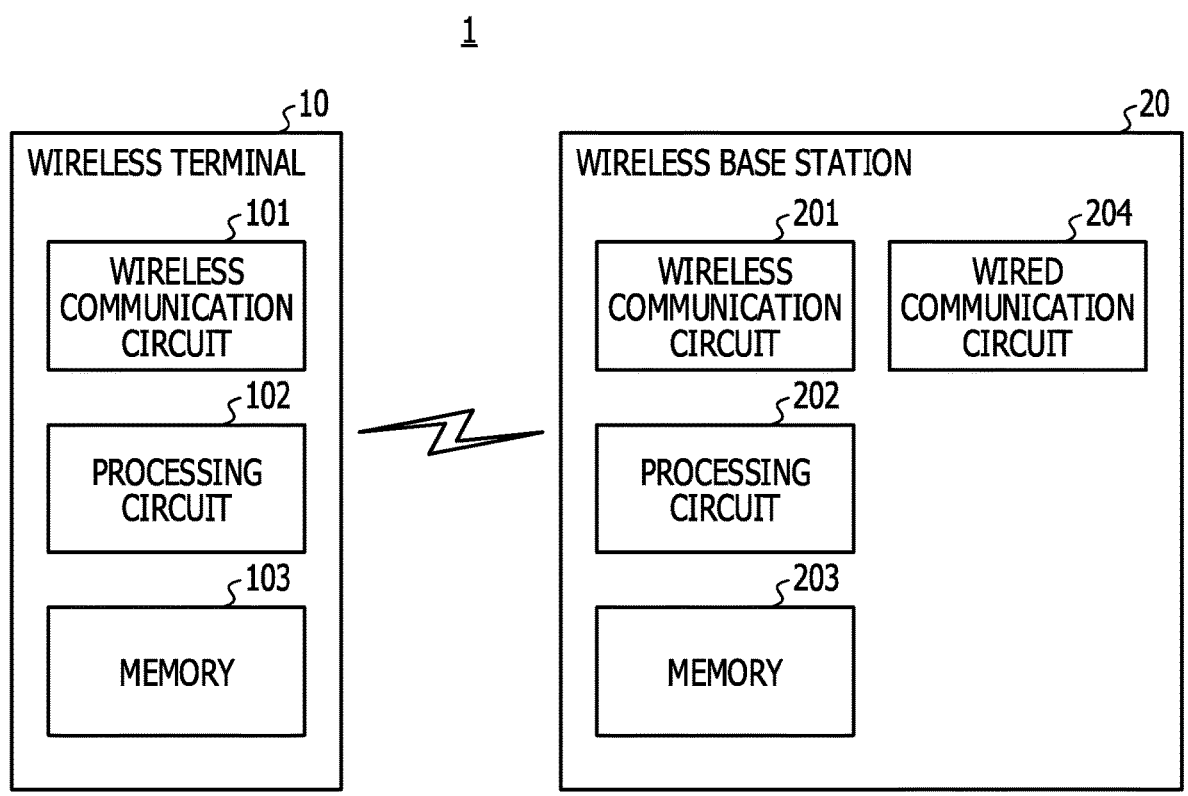
FIG. 16 is a diagram illustrating an example of a hardware configuration of the wireless terminal 10 and the wireless base station 20 in a wireless communication system 1.

Lastly, a hardware configuration of the device used in each of the examples described above will be simply described. FIG. 16 is a diagram illustrating an example of a hardware configuration of the wireless terminal 10 and the wireless base station 20 in the wireless communication system 1.

The wireless terminal 10 illustrated in FIG. 16 includes a wireless communication circuit 101, a processing circuit 102, and a memory 103. In the wireless terminal 10 illustrated in FIG. 16, illustrations of some components such as an antenna are omitted. The wireless terminal 10 may include, for example, a display device such as a liquid crystal display, an input device such as a touch panel, and a battery such as a lithium-ion rechargeable battery.

The wireless communication circuit 101 is configured to receive a supply of a baseband signal (may also be referred to as a wireless signal or a digital wireless signal) from the processing circuit 102, to generate a wireless signal (may also be referred to as a second wireless signal or an analog wireless signal) having a predetermined output level from the baseband signal, and to emit the wireless signal to the space through the antenna. Thus, the wireless terminal 10 may transmit a wireless signal to the wireless base station 20. The wireless communication circuit 101 is configured to receive a wireless signal input from the antenna, to convert the wireless signal into a baseband signal, and to supply the baseband signal to the processing circuit 102. Thus, the wireless terminal 10 may receive a wireless signal from the wireless base station 20. As described above, the wireless communication circuit 101 is configured to be capable of transmitting and receiving a wireless signal, and has a function of performing wireless communication with the wireless base station 20.

The wireless communication circuit 101 may be connected to the processing circuit 102 so as to be capable of a communication through a transmission circuit in the wireless terminal. Examples of the transmission circuit include transmission circuits based on the standards such as M-PHY or Dig-RF.

The processing circuit 102 (may also be referred to as a processor circuit or an arithmetic circuit) is a circuit configured to perform baseband signal processing. The processing circuit 102 is configured to generate a baseband signal (may also be referred to as a wireless signal or a digital wireless signal) based on a protocol stack and to output the baseband signal to the wireless communication circuit 101, in the wireless communication system 1. The processing circuit 102 is configured to perform signal processing such as demodulation or decoding on the baseband signal input from the wireless communication circuit 101, based on the protocol stack in the wireless communication system 1. In other words, in an uplink, the processing circuit 102 has a function as a circuit that transmits a wireless signal to the wireless communication circuit 101 based on second data obtained by sequentially processing transmission data (may be referred to as first data which is to be transmitted), in accordance with procedure of the protocol stack in which the function of wireless communication is divided into a plurality of layers. The processing circuit 102 has a function as a circuit that sequentially processes a wireless signal received through the wireless communication circuit 101, from the lower layer to the higher layer in accordance with the procedure of the protocol stack in which the function of wireless communication is divided into a plurality of layers. Here, receiving an input of a baseband signal from the wireless communication circuit 101 has the meaning of receiving a wireless signal from the wireless base station 20 through the wireless communication circuit 101.

The processing circuit 102 may be, for example, an arithmetic device that reads and executes a program stored in the memory 103 so as to realize an operation of the wireless terminal 10 according to each of the above-described examples. In other words, the processing circuit 102 has a function as a subject that performs the flow of the processing in the wireless terminal 10 illustrated in FIGS. 4, 8, and 11. Examples of the processing circuit 102 include a central processing unit (CPU), a micro processing unit (MPU), a digital signal processor (DSP), a field programmable gate array (FPGA), and combinations thereof. The processing circuit 102 may be a multicore processor including two cores or more. Regarding the processing circuit 102, two or more processing circuits 102 may be mounted in accordance with each layer in the protocol stack in the wireless communication system 1. For example, a processing circuit 102 that performs processing as a first sublayer entity (PDCP entity) belonging to a first sublayer (PDCP layer), a processing circuit 102 that performs processing as a second sublayer entity (RLC entity) belonging to a second sublayer (RLC layer), and a processing circuit 102 that performs processing as a third sublayer entity (MAC entity) belonging to a third sublayer (MAC layer) may be independently mounted.

The processing circuit 102 may be referred to as a C-CPU. In the wireless terminal 10, a processor circuit which is also referred to as an A-CPU that execute an application may be mounted in addition to the processing circuit 102. The processing circuit 102 may be mounted in a form of one chip along with a processor circuit which is also referred to as an A-CPU, or may be mounted in a form of an individual chip. As described above, the processing circuit 102 has a function as a control unit having a function of controlling the operation of the wireless terminal 10.

The memory 103 is a circuit configured to store and hold data or programs relating to baseband signal processing performed by the processing circuit 102. The memory 103 is configured to include both or at least one of a non-volatile storage device and a volatile storage device. For example, a random access memory (RAM), a read-only memory (ROM), a solid state drive (SSD), a hard disk drive (HDD), and the like are exemplified. In FIG. 16, the memory 103 is a generic name of various storage device such as a main storage device and an auxiliary storage device. Similar to the processing circuit 102, regarding the memory 103, two memories 103 or more may be mounted in accordance with each layer in the protocol stack in the wireless communication system 1. For example, a memory 103 used in processing as the first sublayer entity (PDCP entity) belonging to the first sublayer (PDCP layer), a memory 103 used in processing as the second sublayer entity (RLC entity) belonging to the second sublayer (RLC layer), and a memory 103 used in processing as the third sublayer entity (MAC entity) belonging to the third sublayer (MAC layer) may be independently mounted.

The wireless base station 20 illustrated in FIG. 16 includes a wireless communication circuit 201, a processing circuit 202, a memory 203, and a wired communication circuit 204. In the wireless base station 20 illustrated in FIG. 16, the illustration of an antenna is omitted.

The wireless communication circuit 201 is configured to receive a baseband signal from the processing circuit 202, to generate a wireless signal having a predetermined output level from the baseband signal, and to emit the wireless signal to the space through the antenna, in a downlink. The wireless communication circuit 201 is configured to receive a wireless signal input from the antenna, to convert the wireless signal into a baseband signal, and to supply the baseband signal to the processing circuit 202, in an uplink. The wireless communication circuit 201 may be connected to the processing circuit 202 to be capable of a communication via a transmission path such as a common public radio interface (CPRI). The wireless communication circuit may also be referred to as a remote radio head (RRH) or remote radio equipment (RRE). The combination of the wireless communication circuit 201 and the processing circuit 202 is not limited to one-to-one relation. For example, a plurality of processing circuits 202 may be correlated with one wireless communication circuit 201, a plurality of wireless communication circuits 201 may be correlated with one processing circuit 202, or a plurality of wireless communication circuits 201 may be correlated with a plurality of processing circuits 202. As described above, the wireless communication circuit 201 has a function as a communication unit (also referred to as a transmission and reception unit or a second transmission and reception unit) having a function of performing a wireless communication with the wireless terminal 10.

The processing circuit 202 is a circuit configured to perform baseband signal processing. The processing circuit 202 is configured to generate a baseband signal based on the protocol stack in the wireless communication system, and to output the baseband signal to the wireless communication circuit 201, in a downlink. The processing circuit 202 is configured to perform receiving processing such as demodulation or decoding, on a baseband signal input from the wireless communication circuit 201 based on the protocol stack in the wireless communication system, in an uplink. In other words, in a downlink, the processing circuit 202 has a function as a circuit that sequentially processes transmission data which is to be transmitted to the wireless terminal 10 as a receiving device from the higher layer to the lower layer in accordance with the procedures of the protocol stack in which the function of wireless communication is divided into a plurality of layers, and transmits data obtained by the processing through the wireless communication circuit 201. The processing circuit 202 has a function as a circuit that sequentially processes a wireless signal received through the wireless communication circuit 201, from the lower layer to the higher layer in accordance with the protocol stack in which the function of wireless communication is divided into a plurality of layers, in an uplink. Here, receiving an input of a baseband signal from the wireless communication circuit 201 means receiving a wireless signal from the wireless terminal 10 through the wireless communication circuit 201, in an uplink.

The processing circuit 202 may be, for example, an arithmetic device that reads and executes a program stored in the memory 203 so as to realize an operation of the wireless base station 20 according to each of the above-described examples. In other words, the processing circuit 202 has a function as a subject that performs the flow of the processing in the wireless base station 20 illustrated in FIGS. 5, 9, and 13. Examples of the processing circuit 202 include a central processing unit (CPU), a micro processing unit (MPU), a digital signal processor (DSP), a field programmable gate array (FPGA), and combinations thereof. The processing circuit 202 may be a multicore processor including two cores or more. Regarding the processing circuit 202, two or more processing circuits 202 may be mounted in accordance with each layer in the protocol stack in the wireless communication system. For example, a processing circuit 202 that performs processing as a MAC entity belonging to a MAC layer, a processing circuit 202 that performs processing as an RLC entity belonging to an RLC layer, and a processing circuit 202 that performs processing as a PDCP entity belonging to a PDCP layer may be independently mounted. As described above, the processing circuit 202 has a function as a control unit (may also be referred to as a second control unit in order to be distinguished from the control unit of the wireless terminal 10) having a function of controlling the operation of the wireless base station 20.

The memory 203 is a circuit configured to store and hold data or programs relating to baseband signal processing performed by the processing circuit 202. The memory 203 is configured to include both or at least one of a non-volatile storage device and a volatile storage device. For example, a random access memory (RAM), a read-only memory (ROM), a solid state drive (SSD), a hard disk drive (HDD), and the like are exemplified. In FIG. 14, the memory 203 is a generic name of various storage devices such as a main storage device and an auxiliary storage device. Similar to the processing circuit 202, regarding the memory 203, two memories 203 or more may be mounted in accordance with each layer in the protocol stack in the wireless communication system. For example, a memory 203 that performs processing as a MAC entity belonging to a MAC layer, a memory 203 that performs processing as an RLC entity belonging to an RLC layer, and a memory 203 that performs processing as a PDCP entity belonging to a PDCP layer may be independently mounted.

The wired communication circuit 204 performs conversion into packet data having a format allowed to be output to other devices and transmits the packet data to other devices, or extracts data and the like from packet data received from other devices and outputs the extracted data to the memory 203, the processing circuit 202, and the like. Examples of the other devices may include other wireless base stations, mobility management entities (MMEs), or serving gateways (SGWs). The MME and the SGW are also referred to as core nodes. A logical communication interface used in a communication with the core node is also referred to as the S1 interface. A logical communication interface used in a communication with another wireless base station is also referred to as the X2 interface.

The features and advantages of the disclosure will be apparent from the above detailed description. This is intended to cover the features and advantages of the disclosure as described above, without departing from the spirit and scope of the claims. In addition, any person skilled in the related art may easily conceive of all improvements and changes. Accordingly, there is no intention to limit the scope of the inventive disclosure to the above descriptions, and it is also possible to make suitable improvements and equivalents falling within the scope described in this specification. For example, the steps described in this specification do not have to be performed in chronological order according to the sequence described as an example of the flow of the processing. In addition, the order of the steps may be changed, or a plurality of steps may be executed in parallel, within the scope of the gist of the present invention described in the claims. It is desirably noted that the circumstances that may occur in the fifth-generation mobile communication system clarified in the above detailed description may be found when the fifth generation mobile communication system is examined from one aspect, and other circumstances may be found when the fifth generation mobile communication system is examined from other aspects. In other words, the features and advantages of the present invention are not limited to applications that solve the circumstances specified in the above detailed description.

Finally, the configurations of the examples and modifications in the disclosure represent an example for embodying the technical idea of the present invention. The present invention does not intend to be limited to the configurations of these examples and these modifications, other embodiments included in the scope of the claims may be equally made. For example, it is desirably be noted that the terms in the disclosure may be renamed when the specifications in the subsequent fifth-generation mobile communication system are set. It is also desirably noted that one or more names aliases listed for the terms in the disclosure may be mutually synonymous.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless terminal comprising:
a memory configured to store uplink data; and
a controller configured to:
select an index from among a plurality of indices included in a buffer status table according to the uplink data stored in the memory, and
transmit a buffer status report including the index,
wherein the plurality of indices in the buffer status table includes a first index and a second index, the first index being one of the plurality of indices and being different in index value from any other index in the buffer status table, the first index indicating a 0 byte as a buffer size, the second index being one of the plurality of indices except for the first index and being different in index value from any other index in the buffer status table, the second index indicating Reserve as the buffer size.

2. The wireless terminal according to claim 1, wherein the buffer size corresponds to a size of the uplink data stored in memory.

3. The wireless terminal according to claim 1, wherein the memory includes a buffer for storing the uplink data.

4. The wireless terminal according to claim 1, wherein the buffer size corresponds to a size of the uplink data stored in buffer.

5. The wireless terminal according to claim 1, wherein the controller selects index from a plurality of indices without the second index.

6. The wireless terminal according to claim 1, wherein the memory stores the buffer status table in which a range from a minimum value of the buffer to a maximum value of the buffer is divided into a plurality of subranges, the plurality of subranges being associated with a part of the plurality of indices.

7. The wireless terminal according to claim 1, wherein the controller transmits the buffer status report at predetermined period.

8. The wireless terminal according to claim 1,
wherein a range of the plurality of indices is from 0 to 255,
wherein the first index is 0.

9. The wireless terminal according to claim 8, wherein the buffer status report includes a field which stores the index, the field being defined with a length of 8 bits.

10. The wireless terminal according to claim 8,
wherein the buffer status table includes at least pairs defined as follows:
a pair of an index [1] and a subrange [0 byte<BS≤10 bytes];
a pair of an index [2] and a subrange [10 bytes<BS≤11 bytes];
a pair of an index [3] and a subrange [11 bytes<BS≤12 bytes];
a pair of an index [4] and a subrange [12 bytes<BS≤13 bytes];
a pair of an index [5] and a subrange [13 bytes<BS≤14 bytes];
a pair of an index [6] and a subrange [14 bytes<BS≤15 bytes];
a pair of an index [7] and a subrange [15 bytes<BS≤16 bytes];
a pair of an index [8] and a subrange [16 bytes<BS≤17 bytes];
a pair of an index [9] and a subrange [17 bytes<BS≤18 bytes];
a pair of an index [10] and a subrange [18 bytes<BS≤19 bytes];
a pair of an index [11] and a subrange [19 bytes<BS≤20 bytes];
a pair of an index [12] and a subrange [20 bytes<BS≤22 bytes];
a pair of an index [13] and a subrange [22 bytes<BS≤23 bytes];
a pair of an index [14] and a subrange [23 bytes<BS≤25 bytes];
a pair of an index [15] and a subrange [25 bytes<BS≤26 bytes];
a pair of an index [16] and a subrange [26 bytes<BS≤28 bytes];
a pair of an index [17] and a subrange [28 bytes<BS≤30 bytes];
a pair of an index [18] and a subrange [30 bytes<BS≤32 bytes]; and
a pair of an index [19] and a subrange [32 bytes<BS≤34 bytes].

11. The wireless terminal according to of claim 8, wherein the controller is further configured to:
select, based on a logical channel group of a processing target, either one of the buffer status table or another buffer status table, and
select the index from the selected table,
wherein the another buffer status table has a content such that a range from another minimum value of the buffer size to another maximum value of the buffer size is divided into a plurality of another subranges, the plurality of another subranges being associated with a plurality of another buffer status indices in the another predetermined buffer status table,
wherein the another minimum value of the buffer size in the another buffer status table is 0 bytes.

12. The wireless terminal according to claim 11, wherein the another buffer status table is assigned to a logical channel group used in a transmission service having large transmission capacity, and the buffer status table is assigned to another logical channel group used in another transmission service having transmission capacity smaller than that of the transmission service.

13. A wireless base station comprising:
a memory; and
a communicator configured to receive from a terminal a buffer status report including an index, the index is selected from among a plurality of indices included in a buffer status table according to uplink data stored in the terminal; and
a controller configured to allocate a resource after receiving buffer status report, wherein
the communicator transmits to the terminal an uplink grant indicating the resource, and
the plurality of indices includes a first index and a second index, the first index being one of the plurality of indices and being different in index value from any other index in the buffer status table, the first index indicating a 0 byte as a buffer size, the second index being one of the plurality of indices except for the first index and being different in index value from any other index in the buffer status table, the second index indicating Reserve as the buffer size.

14. The wireless base station according to claim 13, wherein the buffer size corresponds to a size of the uplink data stored in the terminal.

15. The wireless base station according to claim 13, further comprising:
a memory configured to store the buffer status table.

16. The wireless base station according to claim 15, wherein
the controller is further configured to:
estimate the size of the uplink data based on the index included in the buffer status report and the buffer status table stored in memory, and
allocate the resource according to the estimated size of the uplink data.

17. The wireless base station according to claim 13, wherein a range of the plurality of indices is from 0 to 255,
wherein the first index is 0.

18. The wireless base station according to claim 17, wherein the buffer status report includes a field which stores the index, the field being defined with a length of 8 bits.

19. The wireless base station according to claim 17, wherein the buffer status table includes at least pairs defined as follows:
a pair of an index [1] and a subrange [0 byte<BS≤10 bytes];
a pair of an index [2] and a subrange [10 bytes<BS≤11 bytes];
a pair of an index [3] and a subrange [11 bytes<BS≤12 bytes];
a pair of an index [4] and a subrange [12 bytes<BS≤13 bytes];
a pair of an index [5] and a subrange [13 bytes<BS≤14 bytes];
a pair of an index [6] and a subrange [14 bytes<BS≤15 bytes];
a pair of an index [7] and a subrange [15 bytes<BS≤16 bytes];
a pair of an index [8] and a subrange [16 bytes<BS≤17 bytes];
a pair of an index [9] and a subrange [17 bytes<BS≤18 bytes];
a pair of an index [10] and a subrange [18 bytes<BS≤19 bytes];
a pair of an index [11] and a subrange [19 bytes<BS≤20 bytes];
a pair of an index [12] and a subrange [20 bytes<BS≤22 bytes];
a pair of an index [13] and a subrange [22 bytes<BS≤23 bytes];
a pair of an index [14] and a subrange [23 bytes<BS≤25 bytes];
a pair of an index [15] and a subrange [25 bytes<BS≤26 bytes];
a pair of an index [16] and a subrange [26 bytes<BS≤28 bytes];
a pair of an index [17] and a subrange [28 bytes<BS≤30 bytes];
a pair of an index [18] and a subrange [30 bytes<BS≤32 bytes]; and
a pair of an index [19] and a subrange [32 bytes<BS≤34 bytes].

20. A wireless communication system comprising:
a terminal configured to:
store uplink data,
select an index from among a plurality of indices included in a buffer status table according to the stored uplink data, and
transmit a buffer status report including the index; and
a base station configured to receive from the terminal the buffer status report,
wherein the plurality of indices in the buffer status table includes a first index and a second index, the first index being one of the plurality of indices and being different in index value from any other index in the buffer status table, the first index indicating a 0 byte as a buffer size, the second index being one of the plurality of indices except for the first index and being different in index value from any other index in the buffer status table, the second index indicating Reserve as the buffer size.

* * * * *